United States Patent
Zhang et al.

(10) Patent No.: US 10,411,937 B2
(45) Date of Patent: Sep. 10, 2019

(54) GENERATING PACKETS HAVING ORTHOGONAL FREQUENCY DIVISION MULTIPLEXING (OFDM) SYMBOLS

(71) Applicant: Marvell World Trade Ltd., St. Michael (BB)

(72) Inventors: Hongyuan Zhang, Fremont, CA (US); Yakun Sun, San Jose, CA (US); Mingguang Xu, San Jose, CA (US); Rui Cao, Fremont, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 16/370,588

(22) Filed: Mar. 29, 2019

(65) Prior Publication Data
US 2019/0229969 A1   Jul. 25, 2019

Related U.S. Application Data

(63) Continuation of application No. 15/793,664, filed on Oct. 25, 2017, now Pat. No. 10,257,006, which is a (Continued)

(51) Int. Cl.
*H04L 27/26* (2006.01)
*H04L 1/06* (2006.01)
(Continued)

(52) U.S. Cl.
CPC .......... *H04L 27/2627* (2013.01); *H04L 1/007* (2013.01); *H04L 1/0042* (2013.01);
(Continued)

(58) Field of Classification Search
CPC ..... H04L 1/0042; H04L 1/007; H04L 1/0643; H04L 5/0048; H04L 27/2602;
(Continued)

(56) References Cited

U.S. PATENT DOCUMENTS

| 6,031,874 A | 2/2000 | Chennakeshu et al. |
| 7,346,007 B2 | 3/2008 | Curcio et al. |

(Continued)

FOREIGN PATENT DOCUMENTS

| CN | 101048994 A | 10/2007 |
| CN | 101953132 A | 1/2011 |

(Continued)

OTHER PUBLICATIONS

Cariou et al., "Multi-channel Transmissions," Doc. No. IEEE 802.11-09/1 022r0, *The Institute of Electrical and Electronics Engineers, Inc.*, Sep. 2009.

(Continued)

*Primary Examiner* — Freshteh N Aghdam

(57) ABSTRACT

A communication device generates a first portion of a physical layer (PHY) preamble of a PHY data unit to include a first plurality of orthogonal frequency division multiplexing (OFDM) symbols. Each OFDM symbol of the first plurality of OFDM symbols is generated with a first OFDM tone spacing. The communication device generate a second portion of the PHY preamble to include a second plurality of OFDM symbols. Each OFDM symbol of the second plurality of OFDM symbols is generated with a second OFDM tone spacing that is a fraction 1/N of the first OFDM tone spacing, where N is a positive integer greater than one. The communication device generates a PHY data portion of the PHY data unit to include one or more third OFDM symbols. Each third OFDM symbol is generated with the second OFDM tone spacing.

21 Claims, 12 Drawing Sheets

Related U.S. Application Data continuation of application No. 14/728,802, filed on Jun. 2, 2015, now Pat. No. 9,832,059.

(60) Provisional application No. 62/027,425, filed on Jul. 22, 2014, provisional application No. 62/006,522, filed on Jun. 2, 2014.

(51) Int. Cl.
| | | |
|---|---|---|
| *H04L 1/00* | (2006.01) | |
| *H04L 5/00* | (2006.01) | |
| *H04W 84/12* | (2009.01) | |

(52) U.S. Cl.
CPC .......... *H04L 1/0643* (2013.01); *H04L 5/0048* (2013.01); *H04L 27/2602* (2013.01); *H04L 27/2613* (2013.01); *H04L 27/2675* (2013.01); *H04L 1/0059* (2013.01); *H04L 1/0071* (2013.01); *H04W 84/12* (2013.01)

(58) Field of Classification Search
CPC ............. H04L 27/2613; H04L 27/2675; H04L 1/0059; H04L 1/0071; H04W 84/12
See application file for complete search history.

(56) References Cited

U.S. PATENT DOCUMENTS

| | | | |
|---|---|---|---|
| 7,599,332 B2 * | 10/2009 | Zelst | H04L 27/2613 370/206 |
| 7,742,390 B2 | 6/2010 | Mujtaba | |
| 7,826,343 B2 | 11/2010 | Krasner | |
| 8,144,647 B2 | 3/2012 | Nabar et al. | |
| 8,149,811 B2 | 4/2012 | Nabar et al. | |
| 8,155,138 B2 | 4/2012 | van Nee | |
| 8,270,909 B2 | 9/2012 | Zhang et al. | |
| 8,289,869 B2 | 10/2012 | Sawai | |
| 8,339,978 B2 | 12/2012 | Sawai et al. | |
| 8,472,383 B1 | 6/2013 | Banerjea et al. | |
| 8,514,976 B2 | 8/2013 | Kim et al. | |
| 8,526,351 B2 | 9/2013 | Fischer et al. | |
| 8,599,804 B2 | 12/2013 | Erceg et al. | |
| 8,619,907 B2 | 12/2013 | Mujtaba et al. | |
| 8,660,497 B1 | 2/2014 | Zhang et al. | |
| 8,665,908 B1 | 3/2014 | Zhang et al. | |
| 8,724,546 B2 | 5/2014 | Zhang et al. | |
| 8,724,720 B2 | 5/2014 | Srinivasa et al. | |
| 8,873,652 B2 | 5/2014 | Srinivasa et al. | |
| 8,773,969 B1 | 7/2014 | Zhang et al. | |
| 8,885,620 B2 | 11/2014 | Liu et al. | |
| 8,886,755 B1 | 11/2014 | Liu et al. | |
| 8,923,217 B2 | 12/2014 | Liu et al. | |
| 8,934,413 B2 * | 1/2015 | Vermani | H04L 1/0029 370/328 |
| 8,971,167 B1 | 3/2015 | Srinivasa et al. | |
| 9,100,254 B2 | 8/2015 | Sampath et al. | |
| 9,118,530 B2 | 8/2015 | Srinivasa et al. | |
| 9,131,528 B2 | 9/2015 | Zhang et al. | |
| 9,832,059 B2 | 11/2017 | Zhang et al. | |
| 10,257,006 B2 | 4/2019 | Zhang et al. | |
| 2004/0081073 A1 | 4/2004 | Walton et al. | |
| 2005/0163236 A1 * | 7/2005 | Hammerschmidt | H04B 7/0671 375/260 |
| 2005/0169261 A1 | 8/2005 | Williams et al. | |
| 2005/0195733 A1 | 9/2005 | Walton et al. | |
| 2006/0250943 A1 * | 11/2006 | Mujtaba | H04B 7/12 370/210 |
| 2007/0140100 A1 | 6/2007 | Ouyang et al. | |
| 2007/0140364 A1 | 6/2007 | Ouyang et al. | |
| 2008/0002649 A1 | 1/2008 | Xia et al. | |
| 2008/0205648 A1 | 8/2008 | Hanov et al. | |
| 2009/0022093 A1 | 1/2009 | Nabar et al. | |
| 2009/0022128 A1 | 1/2009 | Nabar et al. | |
| 2009/0059877 A1 | 3/2009 | Utsunomiya et al. | |
| 2009/0196163 A1 | 8/2009 | Du | |
| 2009/0323850 A1 | 12/2009 | van Nee | |
| 2010/0046656 A1 * | 2/2010 | van Nee | C08F 214/18 375/267 |
| 2010/0260159 A1 | 10/2010 | Zhang et al. | |
| 2010/0322334 A1 | 12/2010 | Wang et al. | |
| 2011/0002219 A1 | 1/2011 | Kim et al. | |
| 2011/0096796 A1 | 4/2011 | Zhang et al. | |
| 2011/0261708 A1 | 10/2011 | Grandhi | |
| 2011/0310827 A1 | 12/2011 | Srinivasa et al. | |
| 2012/0054587 A1 | 3/2012 | Van Nee et al. | |
| 2012/0076234 A1 | 3/2012 | Kim et al. | |
| 2012/0320889 A1 | 12/2012 | Zhang et al. | |
| 2013/0044607 A1 * | 2/2013 | Liu | H04W 8/26 370/242 |
| 2013/0153298 A1 | 6/2013 | Pietraski et al. | |
| 2013/0229996 A1 | 9/2013 | Wang et al. | |
| 2013/0259017 A1 | 10/2013 | Zhang et al. | |
| 2014/0205029 A1 | 7/2014 | Srinivasa et al. | |
| 2014/0211775 A1 | 7/2014 | Sampath et al. | |
| 2014/0362935 A1 | 12/2014 | Porat et al. | |
| 2015/0071372 A1 | 3/2015 | Zhang | |
| 2015/0117227 A1 | 4/2015 | Zhang et al. | |
| 2015/0117433 A1 | 4/2015 | Zhang et al. | |
| 2015/0131517 A1 | 5/2015 | Chu et al. | |
| 2015/0207602 A1 | 7/2015 | Yang et al. | |
| 2015/0327166 A1 | 11/2015 | Kenney et al. | |
| 2015/0365263 A1 | 12/2015 | Zhang et al. | |
| 2015/0365264 A1 | 12/2015 | Srinivasa et al. | |
| 2017/0230863 A9 | 8/2017 | Das et al. | |

FOREIGN PATENT DOCUMENTS

| | | |
|---|---|---|
| CN | 103329447 A | 9/2013 |
| EP | 1432166 A2 | 6/2004 |
| EP | 1601117 A2 | 11/2005 |
| JP | 2004-200923 A | 7/2004 |
| JP | 2005-102201 A | 4/2005 |
| JP | 2005-341317 A | 12/2005 |
| JP | 2006-352379 A | 12/2006 |
| JP | 2009-055464 A | 3/2009 |
| JP | 2009-520436 A | 5/2009 |
| WO | WO-2006/007571 A1 | 1/2006 |
| WO | WO-2008/081683 A1 | 7/2008 |
| WO | WO-2009/028886 A2 | 3/2009 |
| WO | WO-2009/035418 A1 | 3/2009 |
| WO | WO-2012/173975 A2 | 12/2012 |
| WO | WO-2013/116237 A1 | 8/2013 |
| WO | WO-2015/061729 A1 | 4/2015 |

OTHER PUBLICATIONS

Chen, "Home Network Basis: Transmission Environments and Wired/Wireless Protocols," Prentice Hall, pp. 1-26 (Jul. 2003).

Chun et al. "Legacy Support on HEW frame structure," doc: IEEE 11-13/1057r0, *The Institute of Electrical and Electronics Engineers, Inc.*, pp. 1-8 (Sep. 2013).

De Vegt, "Potential Compromise for 802.11ah Use Case Document," Institute of Electrical and Electronics Engineers, doc. No. IEEE 802.11-11/0457r0, pp. 1-27 (Mar. 2011).

Hiertz, et al., "The IEEE 802.11 Universe," *IEEE Communications Magazine*, pp. 62-70, (Jan. 2010).

Ho et al., "Final Draft: SDD Text on Downlink MIMO Schemes", IEEE 802.16 Broadband Wireless Access Working Group, Jul. 7, 2008.

IEEE 802.20-PD-06; IEEE P 802.20™V14, Draft 802.20 Permanent Document; <System Requirements for IEEE 802.20 Mobile Broadband Wireless Access Systems—Version 14>, 24 pages. (Jul. 16, 2004).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).

(56) References Cited

OTHER PUBLICATIONS

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 Ghz Band," *The Institute of Electrical and Electronics Engineers, Inc.*, pp. 1-89 (Sep. 1999).
IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, pp. 1-23 (Nov. 7, 2001).
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band, "*The Institute of Electrical and Electronics Engineers, Inc.*, pp. 1-53 (May 2002).
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, pp. 1-69 (Apr. 2003).
IEEE Std 802.11n/D8.0, Feb. 2009 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 5: Enhancements for Higher Throughput", *The Institute for Electrical and Electronics Engineers*, pp. i, ii, 258, 260-264, 287, 293, 346-347,350-351, 354-356 (Feb. 2009).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.16/2009 (Revision of IEEE Std. 802.16/2004), IEEE Standard for Local and metropolitan area networks: Part 16: Air Interface for Broadband Wireless Access Systems, The Institute of Electrical and Electronics Engineers, Inc., 2082 pages (May 29, 2009).
IEEE Std P802.11-REVma/06.0, (Revision of IEEE Std 802.11-1999) "Unapproved Draft Standard for Information Technology—

(56) References Cited

OTHER PUBLICATIONS

Telecommunications and information exchange between systems—Local and metropolitan area network—Specific requirements Part 11:Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma.sub.—D7.0),pp. 1-1212 (2006).
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
International Preliminary Report on Patentability in International Patent Application No. PCT/US2015/033818, dated Dec. 15, 2016 (11 pages).
International Search Report and Written Opinion for International Application No. PCT/US2015/033818, dated Nov. 25, 2015 (16 pages).
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).
Invitation to Pay Fees and Partial International Search Report for International Application No. PCT/US2015/033818, dated Sep. 18, 2015 (5 pages).
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Noh et al., "Channel Selection and Management for 11ac," Doc. No. IEEE 802.11-10/0593r1, *The Institute of Electrical and Electronics Engineers, Inc.*, May 20, 2010.
Park, "Proposed Specification Framework for TGah D9.x", The Institute of Electrical and Electronics Engineers, doc. No. IEEE 802.11-yy/xxxxr0, pp. 1-30 (Jul. 2012).
Park, "Proposed Specification Framework for TGah", *The Institute of Electrical and Electronics Engineers*, doc. No. IEEE 802.11-11/1137r11, pp. 1-36 (Sep. 2012).
Park, "Proposed Specification Framework for TGah", *The Institute of Electrical and Electronics Engineers*, doc. No. IEEE 802.11-11/1137r6, pp. 1-13 (Mar. 2012).
Park, "Specification Framework for TGah," *The Institute of Electrical and Electronics Engineers*, doc. No. IEEE 802.11-11/1137r13, pp. 1-58 (Jan. 14, 2013).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Shi et al., "Phase Tracking During VHT-LTF," Doc. No. IEEE 802.11-10/0771r0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211 (2009).
Taghavi et al., "Introductory Submission for TGah", doc. No. IEEE 802.11-11/0062r0, *Institute for Electrical and Electronics Engineers*, pp. 1-5 (Jan. 14, 2011).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
U.S. Appl. No. 12/731,007, filed Mar. 24, 2010.
U.S. Appl. No. 14/701,208, filed Apr. 30, 2015.
U.S. Appl. No. 14/701,208, Sun et al., "Adaptive Orthogonal Frequency Divisional Multiplexing (OFDM) Numerology in a Wireless Communication Network," filed Apr. 30, 2015.
Van Nee et al. "The 802.11n MIMO-OFDM Standard for Wireless LAN and Beyond," Wireless Personal Communications, vol. 37, pp. 445-453 (Jun. 2006).
Van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).
Vermani et al. "Preamble Format for 1 MHz," *The Institute of Electrical and Electronics Engineers*, doc. No. IEEE 802.11-11/1482r2, pp. 1-30 (Nov. 2011).
Vermani, et al. "Spec Framework Text for PHY Numerology," *The Institute of Electrical and Electronics Engineers*, doc. No. IEEE 802.11-11/1311r0, pp. 1-5 (Sep. 2011).
Yu et al., "Coverage extension for IEEE802.11ah," *The Institute of Electrical and Electronics Engineers*, doc. No. IEEE 802.11-11/0035r1, pp. 1-10 (Jan. 2011).
Yuan et al., "Carrier Aggregation for L TE-Advanced Mobile Communication Systems," IEEE Communications Magazine, pp. 88-93, Feb. 2010.
Zhang et al., "11ah Data Transmission Flow," *The Institute of Electrical and Electronics Engineers*, doc. No. IEEE 802.11-11/1484r1, pp. 1-15 (Nov. 2011).
Zhang et al., "1MHz Waveform in Wider BW ", *The Institute of Electrical and Electronics Engineers*, doc. No. IEEE 802.11-12/0309r1, pp. 1-10 (Mar. 2012).
Zhang et al., "Beamforming Feedback for Single Stream," *The Institute of Electrical and Electronics Engineers*, doc. No. IEEE 802.11-12/1312r0, pp. 1-22 (Nov. 12, 2012).
Office Action in Japanese Patent Application No. 2016-570884, dated Jan. 30, 2018, with English translation (9 pages).
Erceg et al., "D1.0 Phy Comments Discussion," draft IEEE 802.11-11/0421r1 15 pages. (Mar. 15, 2011).
Office Action in Chinese Patent Application No. 201580041076.1, dated Jul. 5, 2019, with English summary (7 pages).
Search Report in Chinese Patent Application No. 201580041076.1, dated with Office Action of Jul. 5, 2019 (2 pages).

\* cited by examiner

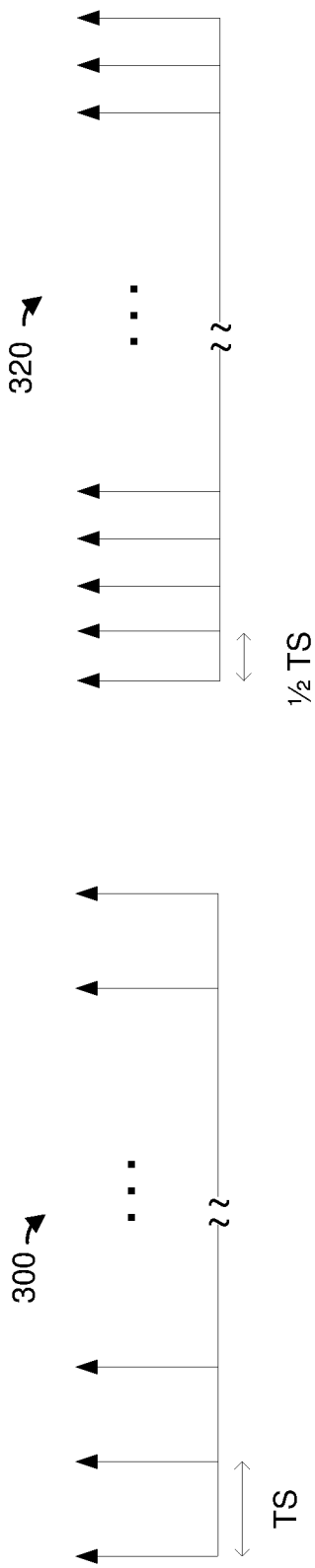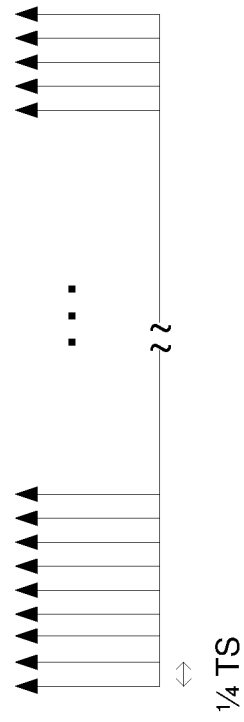

GENERATING PACKETS HAVING ORTHOGONAL FREQUENCY DIVISION MULTIPLEXING (OFDM) SYMBOLS

CROSS-REFERENCES TO RELATED APPLICATIONS

This application is a continuation of U.S. patent application Ser. No. 15/793,664 (now U.S. Pat. No. 10,257,006), entitled "High Efficiency Orthogonal Frequency Division Multiplexing (OFDM) Physical Layer (PHY), filed on Oct. 25, 2017, which is a continuation of U.S. patent application Ser. No. 14/728,802 (now U.S. Pat. No. 9,832,059), entitled "High Efficiency Orthogonal Frequency Division Multiplexing (OFDM) Physical Layer (PHY)," filed on Jun. 2, 2015, which claims the benefit of U.S. Provisional Patent Application No. 62/006,522, entitled "High Efficiency OFDM PHY for WLAN 802.11ax," filed on Jun. 2, 2014, and U.S. Provisional Patent Application No. 62/027,425, entitled "High Efficiency OFDM PHY for WLAN 802.11ax," filed on Jul. 22, 2014. All of the applications referenced above are incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.1 in Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.1 in Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method is for generating a physical layer (PHY) data unit for transmission via a communication channel. The method includes: generating, at a communication device, a first portion of a PHY preamble of the PHY data unit to include a first plurality of orthogonal frequency division multiplexing (OFDM) symbols, wherein each OFDM symbol of the first plurality of OFDM symbols is generated with a first OFDM tone spacing; and generating, at the communication device, a second portion of the PHY preamble to include a second plurality of OFDM symbols, wherein each OFDM symbol of the second plurality of OFDM symbols is generated with a second OFDM tone spacing, wherein the second OFDM tone spacing is a fraction 1/N of the first OFDM tone spacing, and N is a positive integer greater than one. The method also includes: generating, at the communication device, a PHY data portion of the PHY data unit to include one or more third OFDM symbols, wherein each third OFDM symbol is generated with the second OFDM tone spacing; and transmit, by the communication device, the PHY data unit via the communication channel.

In another embodiment, an apparatus comprises: a network interface device having one or more integrated circuits (ICs). The one or more ICs are configured to: generate a first portion of a PHY preamble of a PHY data unit to include a first plurality of orthogonal frequency division multiplexing (OFDM) symbols, wherein each OFDM symbol of the first plurality of OFDM symbols is generated with a first OFDM tone spacing; and generate a second portion of the PHY preamble to include a second plurality of OFDM symbols, wherein each OFDM symbol of the second plurality of OFDM symbols is generated with a second OFDM tone spacing, wherein the second OFDM tone spacing is a fraction 1/N of the first OFDM tone spacing, and N is a positive integer greater than one. The one or more ICs are further configured to: generate a PHY data portion of the PHY data unit to include one or more third OFDM symbols, wherein each third OFDM symbol is generated with the second OFDM tone spacing; and transmit the PHY data unit via a communication channel.

BRIEF DESCRIPTION OF THE DRAWINGS

FIGS. 3A-3C are diagrams illustrating orthogonal frequency division multiplexing (OFDM) tone spacing used with OFDM symbols of a PHY data unit, according to several embodiments;

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency Wi-Fi," "HEW" communication protocol, or IEEE 802.11ax communication protocol. In some embodiments, different client stations in the vicinity of the AP are configured to operate according to one or more other communication protocols which define operation in the same frequency band as the HEW communication protocol but with generally lower data throughputs. The lower data throughput communication protocols (e.g., IEEE 802.11a, IEEE 802.1 in, and/or IEEE 802.11ac) are collectively referred herein as "legacy" communication protocols.

Figure 1:
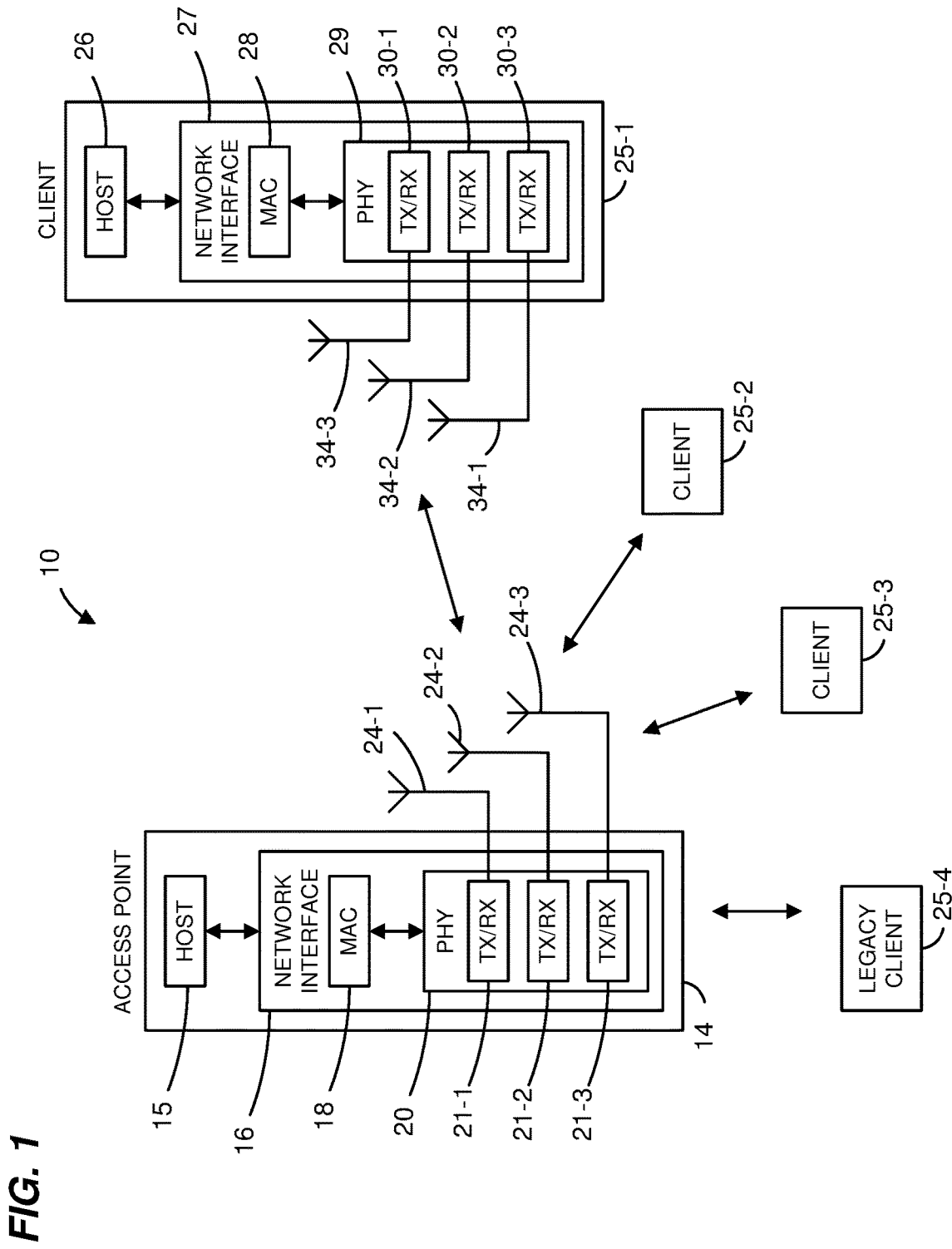
FIG. 1 is a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., HEW communication protocol). In another embodiment, the MAC processing unit 18 and the PHY processing unit 20 are also configured to operate according to a second communication protocol (e.g., IEEE 802.11ac Standard). In yet another embodiment, the MAC processing unit 18 and the PHY processing unit 20 are additionally configured to operate according to the second communication protocol, a third communication protocol and/or a fourth communication protocol (e.g., the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol and/or the fourth communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol and/or the fourth communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive data units via the antenna(s) 24. The PHY processing unit 20 of the AP 14 is configured to process received data units conforming to the first communication protocol and having formats described herein and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

Figures 2A, 2B:
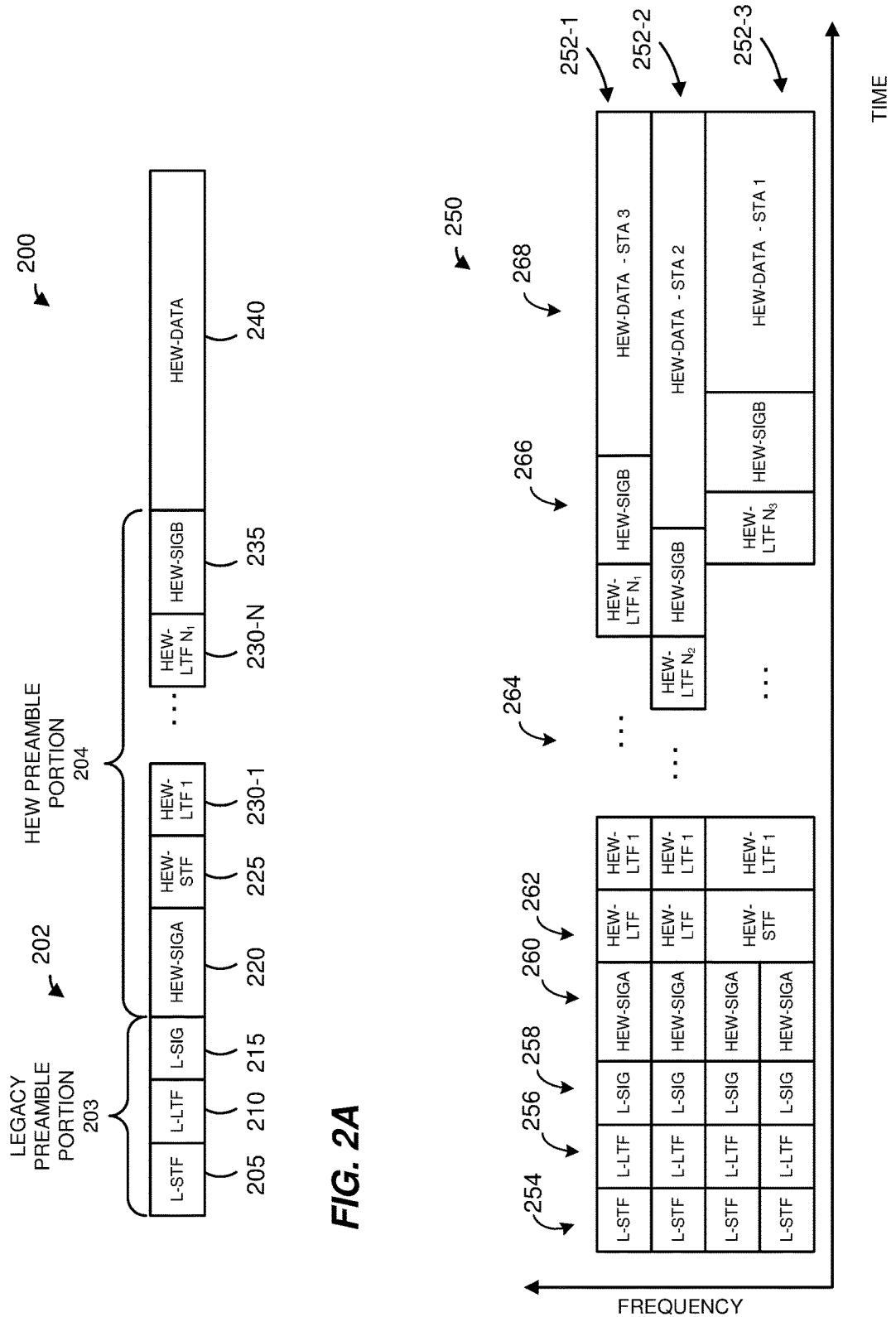
FIGS. 2A-2B are diagrams of physical layer (PHY) data units, according to several embodiments.

FIG. 2A is a diagram of a physical layer (PHY) orthogonal frequency division multiplexing (OFDM) data unit 200 that the AP 14 is configured to transmit to a client station (e.g., the client station 25-1), according to an embodiment. In an embodiment, the client station 25-1 is also configured to transmit the data unit 200 to the AP 14. The data unit 200 conforms to the HEW communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e., when the WLAN 10 includes a client station (e.g., the legacy client station 25-4) that conforms to a legacy communication protocol, but not the first communication protocol. The data unit 200 is utilized in other situations as well, in some embodiments.

The data unit 200 includes a preamble 202, which, in turn, includes a legacy preamble portion 203 and a high efficiency WLAN (HEW) preamble portion 204. The legacy preamble portion 202 includes an L-STF 205, an L-LTF 210, and an L-SIG 215. The HEW preamble portion 203 includes one or more HEW signal field(s) (HEW-SIGA(s)) 220, an HEW short training field (HEW-STF) 225, M HEW long training fields (HEW-LTFs) 230, where M is an integer, and an HEW signal field B (HEW-SIGB) 235. Each of the L-STF 205, the L-LTF 210, the L-SIG 215, the HEW-SIGAs 220, the HEW-STF 225, the M HEW-LTFs 230, and the HEW-SIGB 235 comprises an integer number of one or more OFDM symbols. For example, in an embodiment, the HEW-SIGAs 220 comprise two OFDM symbols, and the HEW-SIGB field comprises one OFDM symbol, in an embodiment. The L-SIG 215, the HEW-SIGAs 220 and the HEW-SIGB 235 generally carry formatting information for the data unit 200, in an embodiment. In some embodiments, the data unit 200 also includes a data portion (HEW-DATA) 240.

In the embodiment of FIG. 2A, the data unit 200 includes one of each of the L-STF 205, the L-LTF 210, the L-SIG 215, and the HEW-SIGA(s) 220. In other embodiments in which an OFDM data unit similar to the data unit 200 occupies a cumulative bandwidth other than 20 MHz, each of the L-STF 205, the L-LTF 210, the L-SIG 215, the HEW-SIGA(s) 220 is repeated over a corresponding number of 20 MHz sub-bands of the whole bandwidth of the data unit, in an embodiment. For example, in an embodiment, the OFDM data unit occupies an 80 MHz bandwidth and, accordingly, includes four of each of the L-STF 205, the L-LTF 210, the L-SIG 215, the HEW-SIGA(s) 220. In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HEW-STF, the HEW-LTFs, the HEW-SIGB and the HEW data portion occupy the corresponding whole bandwidth of the data unit.

In an embodiment, the first communication protocol utilizes the same channelization scheme as defined by a legacy communication protocol. For example, the first communication protocol utilizes the same channelization scheme as defined in the IEEE 802.11ac Standard. In this embodiment, the first communication protocol operates with 20 MHz, 40 MHz, 80 MHz and 160 MHz communication channels. The 20 MHz, 40 MHz, 80 MHz and 160 MHz communication channels coincide, e.g., in center frequencies, with the channels utilized by a legacy communication protocol (e.g., the IEEE 802.11ac Standard). In an embodiment, however, the first communication protocol defines a tone spacing that is different that the tone spacing defined by the legacy communication protocol (e.g., the IEEE 802.11ac Standard). For example, the first communication protocol defines a tone spacing that is a fraction 1/N of the tone spacing defined by the legacy communication protocol, where N is a suitable integer greater than one, in an embodiment. The integer N is an even integer (e.g., 2, 4, 6, 8, 10, etc.), in an embodiment. The integer N is an integer that corresponds to a power of two (e.g., 2, 4, 8, 16, etc.), in an embodiment. The reduced tone spacing is used in the first communication protocol to improve communication range compared to communication range supported or achieved by a legacy communication protocol, in an embodiment. Additionally or alternatively, the reduced tone spacing is used is the first communication protocol to increase throughput compared to throughput achieved in a same bandwidth channel by a legacy communication protocol.

FIG. 2B is a diagram of an example orthogonal frequency division multiple access (OFDMA) data unit 250, according to an embodiment. The OFDMA data unit 250 includes a plurality of OFDM data unit 252-1, 252-2 and 252-3. In an embodiment, the AP 14 transmits the OFDM data units 252-1, 252-2, 252-3 to different client stations 25 via respective OFDM sub-channels within the OFDMA data unit 250. In another embodiment, different client stations 25 transmit respective OFDM data units 252-1, 252-2, 252-3 to the AP 14 in respective OFDM sub-channels within the OFDMA data unit 250. In this embodiment, The AP 14 receives the OFDM data units 252-1, 252-2, 252-3 from the client stations 25 via respective OFDM sub-channels of within the OFDMA data unit 250, in this embodiment.

Each of the OFDM data units 252-1, 252-2, and 252-3 conforms to a communication protocol that supports OFDMA transmission, such as the HEW communication protocol, in an embodiment. In an embodiment in which the OFDMA data unit 250 corresponds to a downlink OFDMA data unit, the OFDMA data unit 250 is generated by the AP 14 such that each OFDM data unit 252 is transmitted to a respective client station 25 via a respective sub-channel of the WLAN 10 allocated for downlink transmission of the OFDMA data unit 250 to the client station. Similarly, an embodiment in which the OFDMA data unit 250 corresponds to an uplink OFDMA data unit, the AP 14 receives the OFDM data units 252 via respective sub-channels of the WLAN 10 allocated for uplink transmission of the OFDM data units 252 from the client stations, in an embodiment. For example, the OFDM data unit 252-1 is transmitted via a first 20 MHZ sub-channel of the WLAN 10, the OFDM data unit 252-2 is transmitted via a second 20 MHz sub-channel of the WLAN 10, and the OFDM data unit 252-3 is transmitted via a 40 MHz sub-channel of the WLAN 10, in the illustrated embodiment.

In an embodiment, each of the OFDM data units 252 includes a preamble including one or more legacy short training fields (L-STF) 254, one or more legacy long training fields (L-LTF) 256, one or more legacy signal fields (L-SIG) 258, one or more first high efficiency WLAN signal field (HEW-SIG-A) 260, N HEW long training fields (HEW-LTF) and a second HEW signal field (HEW-SIGB) 264. Additionally, each OFDM data unit 252 includes a high efficiency WLAN data portion (HEW-DATA) 268. In an embodiment, each L-STF field 254, each L-LTF field 256, each L-SIG field 258 and each HEW-SIGA field 260 occupies a smallest bandwidth supported by the WLAN 10 (e.g., 20 MHz). In an embodiment, if an OFDM data unit 252 occupies a bandwidth that is greater than the smallest bandwidth of the WLAN 10, then each L-STF field 254, each L-LTF field 256, each L-SIG field 258 and each HEW-SIGA field 260 is duplicated in each smallest bandwidth portion of the OFDM data unit 252 (e.g., in each 20 MHz portion of the data unit 252). On the other hand, each HEW-STF field 262, each HEW-LTF field 264, each HEW-SIGB field 266 and each HEW data portion 268 occupies an entire bandwidth of the corresponding OFDM data unit 252, in an embodiment. For example, the OFDM data unit 252-3 occupies 40 MHz, wherein L-STF field 254, the L-LTF field 256, L-SIG field 258 and HEW-SIGA fields 260 is duplicated in the upper and the lower 20 MHz bands of the OFDM data unit 252-3, while each of the HEW-STF field 262, each of the HEW-LTF fields 264, each of the HEW-SIGB field 266 and each of the HEW data portion 268 occupies the entire 40 MHz bandwidth of the data unit 252, in the illustrated embodiment.

In some embodiments, data for different client stations 25 is transmitted using respective sets of OFDM tones assigned to the client stations 25, wherein a set OFDM tones assigned to a client station 25 may correspond to a bandwidth that is smaller than the smallest channel of the WLAN 10. For example, a set of OFDM tones assigned to a client station 25 corresponds to a bandwidth that is smaller than 20 MHz (e.g., 5 MHz, 10 MHz, 15 MHz, or any other suitable bandwidth less than 20 MHz), in an embodiment. In an embodiment, if an OFDM data unit 252 occupies a bandwidth that is smaller than the smallest bandwidth of the WLAN 10, then each L-STF field 254, each L-LTF field 256, each L-SIG field 258 and each HEW-SIGA field 260 nonetheless occupies the entire smallest bandwidth portion of the OFDM data unit 252 (e.g., in 20 MHz portion of the data unit 252). On the other hand, each HEW-STF field 262, each HEW-LTF field 264, each HEW-SIGB field 266 and each HEW data portion 268 occupies the smaller bandwidth of the corresponding OFDM data unit 252, in an embodiment. Generally, a data unit 252 corresponds to any suitable number of OFDM tones within the data unit 250, in an embodiment.

A set of OFDM tones corresponding to a client station 25 is sometimes referred to herein as a "resource unit (RU)". In an embodiment, each OFDM data unit 252 corresponds to a client station 25 and to a resource unit assigned to the client station 25. In various embodiments, an RU corresponding to a client station 25 includes a suitable number of OFDM tones within the data unit 250. For example, an RU includes 26, 52, 106, 242, 484 or 996 OFDM tones, in some embodiments and/or scenarios. In other embodiments, an RU includes other suitable numbers of OFDM tones.

In an embodiment, padding is used in one or more of the OFDM data units 252 to equalize lengths of the OFDM data units 252. Accordingly, the length of each of the OFDM data units 252 correspond to the length of the OFDMA data unit 252, in this embodiment. Ensuring that the OFDM data units 252 are of equal lengths synchronizes transmission of acknowledgment frames by client stations 25 that receive the data units 252, in an embodiment. In an embodiment, each of one or more of the OFDM data units 252 is an aggregate MAC service data units (A-MPDU), which is in turn included in a PHY protocol data unit (PPDU). In an embodiment, padding (e.g., zero-padding) within one or more of the A-MPDUs 252 is used to equalize the lengths of the data units 252, and to synchronize transmission of acknowledgement frames corresponding to the OFDMA data unit 250.

FIGS. 3A-3C are diagrams illustrating OFDM tone spacing used with OFDM symbols of a data unit, such as the data unit 200 of FIG. 2A or the data unit 250 of FIG. 2B, in some embodiments. Turning first to FIG. 3A, a tone spacing 300 corresponds to tone spacing defined in a legacy communication protocol. For example, the tone spacing 300 corresponds to the tone spacing defined in the IEEE 802.11ac Standard, in an embodiment. In an embodiment, an OFDM symbol generated with the tone spacing 300 for a particular bandwidth is generated using an Inverse Discrete Fourier Transform (IDFT) size that results in a tone spacing (TS) of 312.5 kHz in the particular bandwidth. For example, an OFDM symbol generated with the tone spacing 300 for a 20 MHz bandwidth is generated using a 64 point IDFT, resulting in the tone spacing (TS) of 312.5 kHz, in an embodiment. Similarly, an OFDM symbol generated with the tone spacing 300 for a 40 MHz bandwidth is generated using a 128 point IDFT, an OFDM symbol generated with the tone spacing 300 for an 80 MHz bandwidth is generated using a 256 point IDFT, an OFDM symbol generated with the tone spacing 300 for a 160 MHz bandwidth is generated using a 512 point IDFT, etc., in an embodiment. Alternatively, in some embodiments, an OFDM symbol generated for at least some of the channel bandwidths is generated using an IDFT size that results in a tone spacing (TS) of 312.5 kHz in a sub-band of the entire bandwidth. In such embodiments, multiple sub-bands of the OFDM symbol are individually generated using the IDFT size that results in the tone spacing (TS) of 312.5 kHz in the individual sub-bands. For example, an OFDM symbol for a 160 MHz-wide channel is generated using a 256 point IDFT in each one of the two 80 MHz sub-bands of the 160 MHz-wide channel, in an embodiment.

Turning now to FIG. 3B, a tone spacing 320 is reduced by a factor 2 (½) with respect to the tone spacing 300 of FIG. 3A. For example, continuing with the example above, whereas on OFDM symbol generated with the tone spacing 300 for a 20 MHz bandwidth is generated using a 64 point IDFT, an OFDM symbol generated with the tone spacing 320 for a 20 MHz bandwidth is generated using a 128 point IDFT, resulting in the ½ of the tone spacing 300 of FIG. 3A (i.e., 156.25 kHz). Similarly, an OFDM symbol generated with the tone spacing 320 for a 40 MHz-wide channel is generated using a 256 point IDFT, an OFDM symbol generated with the tone spacing 320 for an 80 MHz bandwidth channel is generated using a 512 point IDFT, an OFDM symbol generated with the tone spacing 320 for a 160 MHz bandwidth channel is generated using a 1024 point IDFT, etc., in an embodiment. Alternatively, in some embodiments, an OFDM symbol generated for at least some of the channel bandwidths is generated using an IDFT size that results in a tone spacing (TS) of 156.25 kHz in a sub-band of the entire bandwidth. In such embodiments, multiple sub-bands of the OFDM symbol are individually generated with the IDFT size that results in the tone spacing (TS) of 312.5 kHz in the individual sub-bands. For example, an OFDM symbol for a 160 MHz bandwidth channel is generated using a 512 point IDFT in each one of the two 80 MHz sub-bands of the 160 MHz bandwidth channel, in an embodiment.

Turning now to FIG. 3C, a tone spacing 350 is reduced by a factor 4 (¼) with respect to the tone spacing 300 of FIG. 3A. For example, continuing again with the example above, whereas an OFDM symbol generated with the tone spacing 300 for a 20 MHz bandwidth is generated using a 64 point IDFT, an OFDM symbol generated with the tone spacing 350 for a 20 MHz bandwidth is generated using a 256 point IDFT, resulting in the ¼ of the tone spacing 300 of FIG. 3A (i.e., 78.125 kHz), in an embodiment. Similarly, an OFDM symbol generated with the tone spacing 350 for a 40 MHz bandwidth channel is generated using a 512 point IDFT, an OFDM symbol generated with the tone spacing 350 for an 80 MHz bandwidth channel is generated using a 1024 point IDFT, an OFDM symbol generated with the tone spacing 350 for a 160 MHz bandwidth channel is generated using a 2048 point IDFT, etc., in an embodiment. Alternatively, in some embodiments, an OFDM symbol generated for at least some of the channel bandwidths is generated using an IDFT size that results in a tone spacing (TS) of 78.125 kHz in a sub-band of the entire bandwidth. In such embodiments, multiple sub-bands of the OFDM symbol are individually generated with the IDFT size that results in the tone spacing (TS) of 312.5 kHz in the individual sub-bands. For example, an OFDM symbol for a 160 MHz bandwidth channel is generated using a 512 point IDFT each one of the 80 MHz sub-bands of the 160 MHz bandwidth channel, in an embodiment. As just another example, an OFDM symbol for a 40 MHz bandwidth channel is generated using a 256 point IDFT in each one of the 20 MHz sub-bands of the 40 MHz bandwidth channel, in an embodiment. As yet another example, in yet another embodiment, an OFDM symbol for an 80 MHz bandwidth channel is generated using a 256 point IDFT in each one of the four 20 MHz sub-bands of the 80 MHz bandwidth channel, in an embodiment.

A tone spacing defined in a legacy communication protocol, such as the tone spacing 300 of FIG. 3A, is sometimes referred to herein as "normal tone spacing" and a tone spacing that is smaller than the tone spacing defined by the legacy communication protocol, such as the tone spacing 320 of FIG. 3B and the tone spacing 350 of FIG. 3C is sometimes referred to herein as "reduced tone spacing."

Generally speaking symbol duration of an OFDM symbols, in time, is inversely proportional to the tone spacing used with the OFDM symbol. That is, if $\Delta f$ corresponds to the tone spacing used with an OFDM symbol, then the time symbol duration of the OFDM symbol is $T=1/\Delta f$. Accordingly, a relatively smaller tone spacing used with an OFDM symbol results in a relatively larger symbol duration of the OFDM symbol, and vice versa, in an embodiment. For example, a tone spacing of $\Delta f=312.5$ kHz as in FIG. 3A results in an OFDM symbol duration of 3.2 µs, while a tone spacing of $\Delta f=156.25$ kHz as in FIG. 3B results in an OFDM symbol duration of 6.4 µs, in an embodiment. Further, a sampling rate at which a receiving device needs to sample the OFDM symbol is inversely proportional to the IDFT size (number of points) used to generate the OFDM symbol. In particular, in an embodiment, if $N_{fft}$ is the IDFT size used to generate the OFDM symbol, then the sampling rate at which the receiving device needs to sample the OFDM symbol is $T/N_{fft}$, where T is the OFDM symbol duration ($T=1/\Delta f$).

In an embodiment, the first communication protocol defines a set of guard intervals of different lengths that may be used with OFDM symbols to prevent or minimize inter-symbol interference at the receiver caused by multipath propagation in the communication channel. Generally speaking, a sufficiently long guard interval is needed to mitigate interference based on the delay spread of the particular channel being utilized, in an embodiment. On the other hand, a relatively shorter guard interval, particularly in terms of a ratio of the guard interval relative to a length of the OFDM symbol and, accordingly, amount of "useful" data that can be transmitted in the OFDM symbol, generally results in a smaller overhead associated with the guard interval and improves overall throughput, in an embodiment.

Figure 4:
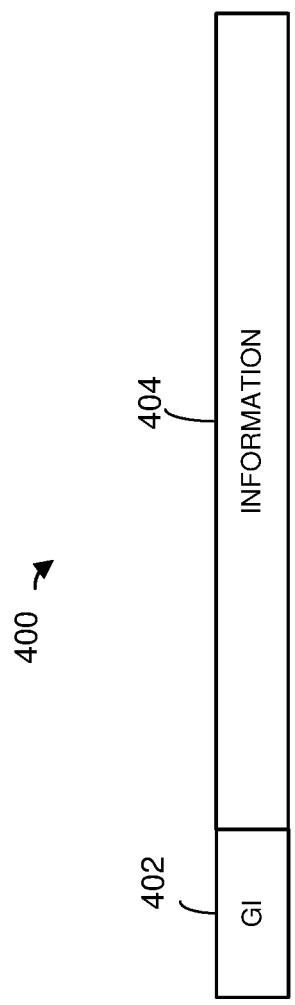
FIG. 4 is a diagram illustrating a guard interval used with an OFDM symbol of a data unit, according to an embodiment.

FIG. 4 is a diagram illustrating a guard interval used with an OFDM symbol of a data unit, such as the data unit 200 of FIG. 2A or the data unit 250 of FIG. 2B, according to an embodiment. In an embodiment, a guard interval portion 402 is pre-pended to an information portion of the OFDM symbol 404. In an embodiment, the guard interval comprises a cyclic prefix repeating an end portion of the information portion 504. In an embodiment, the guard interval portion 402 is used to ensure orthogonality of OFDM tones at a receiving device (e.g., the client station 25-1) and to minimize or eliminate inter-symbol interference due to multi-path propagation in the communication channel via which the OFDM symbol is transmitted.

According to an embodiment, the length of the guard interval portion 402 to be used with particular OFDM symbols of the data unit 200 is selected from a set of guard intervals supported by the HEW communication protocol. For example, the set of guard intervals supported by the HEW communication protocol includes 0.4 µs, 0.8 µs, 1.6 µs, and 3.2 µs guard intervals. In other embodiments, the set of guard intervals supported by the HEW communication protocol exclude one or more of 0.4 µs, 0.8 µs, 1.6 µs, and 3.2 µs and/or include one or more suitable guard intervals other than 0.4 µs, 0.8 µs, 1.6 µs, and 3.2 µs instead of or in addition to the guard intervals 0.4 µs, 0.8 µs, 1.6 µs, and 3.2 µs. In an embodiment, in accordance with terminology used in a legacy communication protocol (e.g., the IEEE 802.11n Standard or the IEEE 802.11ac Standard), a guard interval of 0.8 µs is sometimes referred to herein as a "normal guard interval" and a guard interval of 0.4 µs is sometimes referred to herein as "short guard interval."

In an embodiment, the first communication protocol defines at least a first transmission mode (e.g. normal mode) the utilizes the normal tone spacing and supports guard intervals defined by a legacy communication protocol (e.g., the IEEE 802.11ac Standard) and a second transmission mode (e.g., a high efficiency mode) that utilizes a reduced tone spacing and/or a larger guard interval compared to the tone spacing and guard intervals of the legacy communication protocol. For example, the normal mode utilizes the normal tone spacing 300 of FIG. 3A and supports 0.4 µs and 0.8 µs guard intervals, in an embodiment. The high efficiency mode, on the other hand, utilizes the ¼ tone spacing 350 of FIG. 3C and supports two or more of (e.g., two of, three of, four of, etc.) 0.4 µs, 0.8 µs, 1.6 µs, 2.4 µs and 3.2 µs guard interval options or other suitable guard interval options, in an example embodiment. Alternatively, in another embodiment, the first communication protocol defines a normal mode that utilizes a reduced tone spacing (e.g., ½ tone spacing or ¼ tone spacing) and supports two or more of (e.g., two of, three of, four of, etc.) 0.4 µs, 0.8 µs, 1.6 µs, 2.4 µs and 3.2 µs guard interval options or other suitable guard interval options.

In an embodiment, the particular transmission mode being used with a data unit, such as the data unit 200 of FIG. 2A or the data unit 250 of FIG. 2B, is signaled to a receiving device via a mode indication included in the preamble of the data unit. For example, referring to the data unit 200 of FIG. 2A, the HEW-SIGA field 220 or the HEW-SIGB field 235 includes an indication of the transmission mode used with the data unit 200, in an embodiment. In another embodiment, the preamble of a data unit, such as the data unit 200 of FIG. 2A or the data unit 250 of FIG. 2B, is formatted such that a receiving device can auto-detect transmission mode used with the data unit 200 based on modulation (e.g., binary phase shift keying (BPSK) verses binary phase shift keying shifted by 90 degrees (Q-BPSK)) of one or more fields of the preamble of the data unit 200.

In some embodiments, some of the OFDM symbols of a data unit such as the data unit 200 of FIG. 2A or the data unit 250 of FIG. 2B are generated using the normal tone spacing and the regular guard interval (e.g., 0.8 s) of a legacy communication protocol (e.g., the IEEE 802.11ac Standard), while other OFDM symbols of the data unit are generated using a reduced tone spacing (e.g., the ½ tone spacing 320 of FIG. 3B or the tone spacing 350 of FIG. 3C) and/or using a longer guard interval compared to guard intervals supported by the legacy communication protocol. For example, referring to FIG. 2A, the L-STF 205, the L-LTF 210, the L-SIG 215, the HEW-SIGA 220 and the HEW-STF field 225 are generated using the using the normal tone spacing and the regular guard interval (e.g., 0.8 s) of the IEEE 802.11ac Standard, while the HEW-LTFs 230, the HEW-SIGB 235 and the data portion 240 are generated using a reduced tone spacing (e.g., the ½ tone spacing 320 of FIG. 3B or the tone spacing 350 of FIG. 3C) and/or using a longer guard interval compared to guard intervals supported by the IEEE 802.11ac Standard, in an embodiment. As another example, in another embodiment, the L-STF 205, the L-LTF 210, the L-SIG 215 and the HEW-SIGA 220 are generated using the using the normal tone spacing and the regular guard interval (e.g., 0.8 s) of the IEEE 802.11ac Standard, the HEW-STF field is generated using the normal tone spacing and a longer guard interval compared to the guard intervals supported by the IEEE 802.11ac Standard, and the HEW-LTFs 230, the HEW-SIGB 235 and the data portion 240 are generated using a reduced tone spacing (e.g., the ½ tone spacing 320 of FIG. 3B or the tone spacing 350 of FIG. 3C) and/or using a longer guard interval compared to guard intervals supported by the IEEE 802.11ac Standard.

Figure 5:
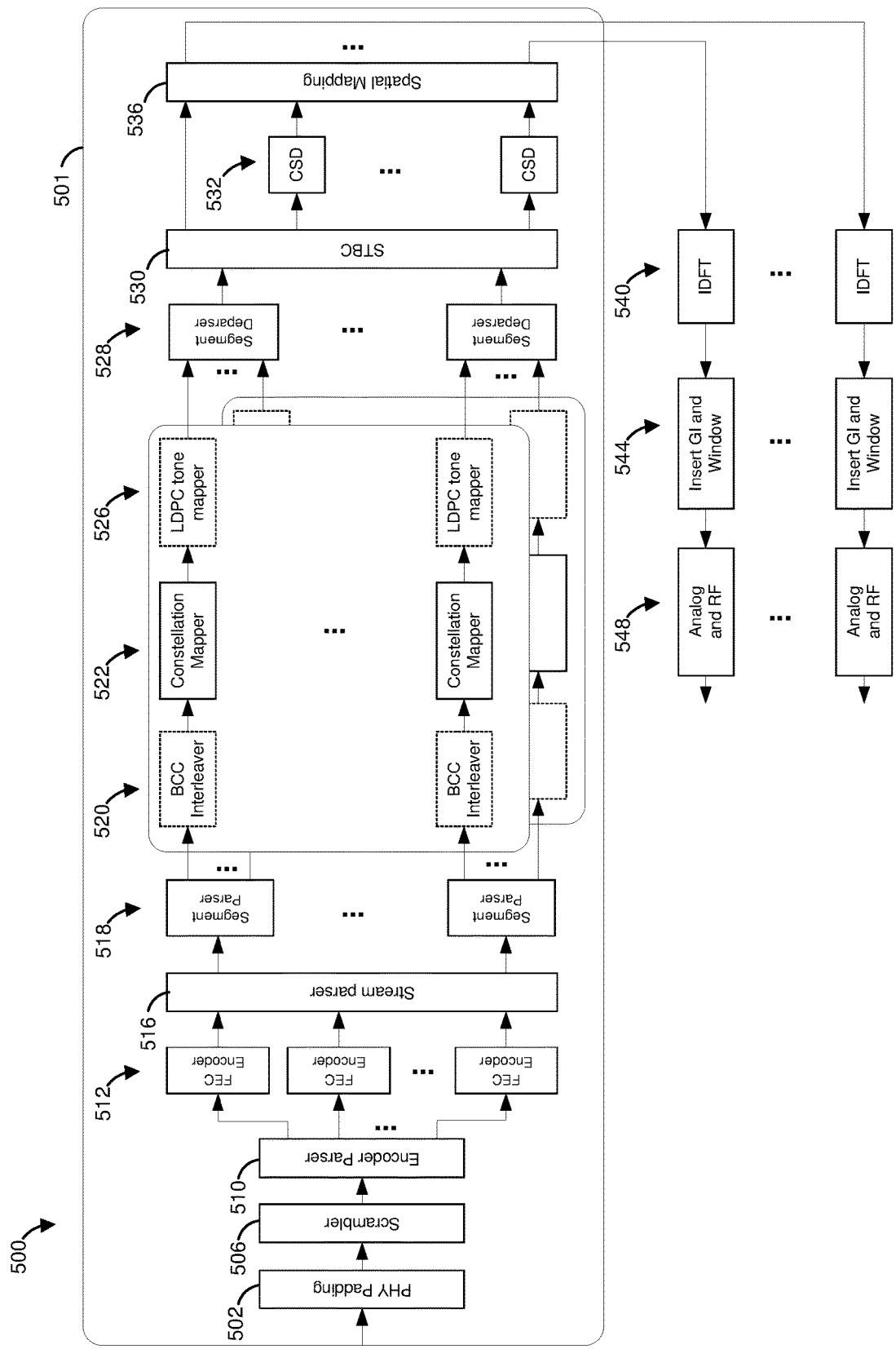
FIG. 5 is a block diagram of a PHY processing unit, according to an embodiment.

FIG. 5 is a block diagram of a transmit portion of an example PHY processing unit 500 configured to generate data units, such as the data unit 200 of FIG. 2A or the data unit 250 of FIG. 2B, that conform to the first communication protocol, according to an embodiment. Referring to FIG. 1, the PHY processing unit 20 of AP 14 and the PHY processing unit 29 of client station 25-1 are each similar to or the same as PHY processing unit 500, in one embodiment. The PHY processing unit 500 is configured to generate data units such as the data unit 200 of FIG. 2A or the data unit 250 of FIG. 2B, in an embodiment. In other embodiments, however, the PHY processing unit 500 is configured to generate suitable data units different from the data unit 200 of FIG. 2A or the data unit 250 of FIG. 2B. Similarly, suitable PHY processing units different from the PHY processing unit 400 is configured to generate data unit such as the data unit 200 of FIG. 2A or the data unit 250 of FIG. 2B, in some embodiments.

In an embodiment, the PHY processing unit 500 includes a processing path 501, which in turn includes a PHY padding unit 502, a scrambler 506, an encoder parser 510, one or more forward error correction (FEC) encoders 512, a stream parser 516, segment parsers 518, BCC interleavers 502, constellation mappers 522, LDPC tone mappers 526, segment deparsers 528, a space-time block coding (STBC) unit 530, cyclic shift diversity (CSD) units 532 and a spatial mapping unit 536. The various components of the processing path 501, according to some embodiments, are described in more detail below. Some of the components of the processing path 501 are bypassed or omitted, as described in more detail below, in some embodiments. Further, in an embodiment in which the processing unit 500 is configured to generate OFDMA data units such as the data unit 25 of FIG. 2B, the PHY processing unit 500 includes multiple processing paths 501, each processing path 501 corresponding to a particular client station to which the OFDMA data unit is to be transmitted, in an embodiment. More generally, in an embodiment, a processing path 501 of the PHY processing unit 500 corresponds to a subset of OFDM tones, or a resource unit, assigned to a client station 25.

In an embodiment, the padding unit 502 of the processing path 501 adds one or more padding bits to an information bit stream prior to providing the information bit stream to the scrambler 506, according to an embodiment. The scrambler 506 generally scrambles the information bit stream to reduce occurrences of long sequences of ones or zeros, in an embodiment. The encoder parser 510 is coupled to the scrambler 506. The encoder parser 510 demultiplexes the information bit stream into one or more encoder input streams corresponding to one or more FEC encoders 512.

While three FEC encoders 512 are shown in FIG. 5, different numbers of FEC encoders are included, and/or different numbers of FEC encoders operate in parallel, in various embodiments and/or scenarios. For example, according to one embodiment, the PHY processing unit 500 includes four FEC encoders 512, and one, two, three, or four of the FEC encoders 512 operate simultaneously depending on the particular modulation and coding scheme (MCS), bandwidth, and number of spatial streams. Each FEC encoder 512 encodes the corresponding input stream to generate a corresponding encoded stream. In one embodiment, each FEC encoder 512 includes a binary convolutional coder (BCC). In another embodiment, each FEC 512 encoder includes a BCC followed by a puncturing block. In another embodiment, each FEC encoder 512 includes a low density parity check (LDPC) encoder. In some embodiments in which LDPC encoding is utilized, only one encoder 512 is utilized to encode the bit information stream, and the encoder parser 510 is bypassed or omitted.

A stream parser 516 parses the one or more encoded streams into one or more spatial streams for separate interleaving and mapping into constellation points/symbols. In one embodiment, the stream parser 516 operates according to the IEEE 802.11ac Standard, such that the following equation is satisfied:

$$s = \max\left\{1, \frac{N_{BPSCS}}{2}\right\} \quad \text{Equation 1}$$

where s is the number of coded bits assigned to a single axis in a constellation point for each of $N_{SS}$ spatial streams, and where $N_{BPSCS}$ is the number of bits per subcarrier. For each FEC encoder 512 (whether BCC or LDPC), consecutive blocks of s coded bits are assigned to different spatial streams in a round robin fashion, in an embodiment. In some embodiments where the set of FEC encoders 512 includes two or more BCC encoders, the outputs of the individual FEC encoders 512 are used in an alternating fashion for each round-robin cycle, i.e., initially S bits from the first FEC encoder 512 are fed into $N_{SS}$ spatial streams, then S bits from the second FEC encoder 106 are fed into the $N_{SS}$ spatial streams, and so on, where:

$$S = N_{SS} \times s \quad \text{Equation 2}$$

Corresponding to each of the $N_{SS}$ spatial streams, a segment parser 518 parses the coded bits into multiple segments. In an embodiment, each segment parser 518 parses coded bits at an output of the stream parser 516 into a plurality of segments corresponding to a plurality of frequency sub-bands of the communication channel for which the data unit is being generated. As just an illustrative example, for a 40 MHz wide communication channel, each segment parser 518 parses coded bits at an output of the stream parser 518 to two segments corresponding to two 20 MHz frequency sub-bands of the 40 MHz channel. As another example, for a 160 MHz communication channel, each segment parser 518 parses coded bits at an output of the stream parser 516 to two segments corresponding to two 80 MHz frequency sub-bands of the 160 MHz channel, in an embodiment. Although each segment parser 518 is illustrated in FIG. 5 as a two segment parser having two outputs, each segment parser 518 parses coded bits into a number of segments greater than two, in some embodiments. For example, for an 80 MHz wide communication channel, each segment parser 518 parses coded bits at an output of the stream parser 516 to four segments corresponding to four 20 MHz frequency sub-bands of the 80 MHz channel, in an embodiment. As another example, for a 160 MHz communication channel, a segment parser 518 parses coded bits at an output of the stream parser 516 to eight segments corresponding to eight 20 MHz frequency sub-bands of the 160 MHz channel, in an embodiment.

In an embodiment, the segment parsers 518 are utilized in only some transmission modes (e.g., corresponding to only some channel bandwidths), and are bypassed or omitted in other transmission modes (e.g., for other channel bandwidths). For example, in an embodiment, the segment parsers 518 are utilized in transmission modes corresponding to a communication channel having a 40 MHz bandwidth and to a communication channels having a 160 MHz, and are bypassed or omitted in transmission modes corresponding to a communication channel having a 20 MHz bandwidth and to a communication channels having a 80 MHz, in an embodiment. As another example, the segment parsers 518 are utilized in a transmission mode corresponding to a communication channel having a 160 MHz bandwidth, and are bypassed or omitted in transmission modes corresponding to communication channels having a 20 MHz bandwidth, a 40 MHz bandwidth and an 80 MHz bandwidth, in another embodiment. In other embodiments, however, the segment parsers 518 are utilized and/or are bypassed in transmission modes corresponding to other suitable channel bandwidths.

Coded bits corresponding to each spatial stream and each segment are operated on by a respective BCC interleaver 520, in an embodiment. In an embodiment, an interleaver 520, corresponding to a spatial stream and a segment, interleaves bits (i.e., changes the order of the bits) of the spatial stream and the segment to prevent long sequences of adjacent noisy bits within the spatial stream and the segment from entering a decoder at the receiver. More specifically, the interleaver 520 maps adjacent coded bits onto non-adjacent locations in the frequency domain or in the time domain. The interleaver 520 performs two frequency permutations in each data stream, and a third permutation to cyclically shift bits differently on different streams, in an embodiment. The parameters $N_{col}$, $N_{row}$, and $N_{rot}$ (i.e., number of columns, number of rows, and frequency rotation parameter, respectively) used by the interleaver 520 are suitable values based on the bandwidth of the data unit being generated and the FFT size to be utilized for generating the data unit, in various embodiments. In an embodiment, the first permutation by the interleaver 520 ensures that adjacent coded bits are mapped onto non-adjacent sub-carriers of the signal. The second permutation performed by the interleaver 520 ensures that adjacent coded bits are mapped alternatively onto less and more significant bits of the constellation to avid long sequences of low reliability bits, in an embodiment. Further the third permutation is performed by the interleaver 520 in embodiments with multiple spatial streams, and the third permutation, in an embodiment, performs a different frequency rotation on respective different spatial streams.

In an embodiment, the parameters $N_{col}$, $N_{row}$, and $N_{rot}$ utilized by the BCC interleavers 520 for an OFDM symbol being generated for a 20 MHz-wide channel correspond to $N_{col}$, $N_{row}$, and $N_{rot}$, respectively, defined by the IEEE 802.11ac Standard for an 80 MHz communication channel. Similarly, in an embodiment in which two segments of coded bits for a 40 MHz communication channel are respectively operated on by two BCC interleaver 520, the parameters $N_{col}$, $N_{row}$, and $N_{rot}$ for an OFDM symbol being generated for a 40 MHz-wide channel correspond to $N_{col}$, $N_{row}$, and $N_{rot}$, respectively, used for a 20 MHz-wide channel of the first communication protocol (e.g., the $N_{col}$, $N_{row}$, and $N_{rot}$ parameters defined for an 80 MHz communication by the IEEE 802.11ac Standard), in an embodiment. On the other hand, in an embodiment in which an OFDM symbol for a 40 MHz channel is generated using a single segment of coded bits (e.g., the segment parsers 518 are omitted or bypassed), new (e.g., not previously defined in the IEEE 802.11ac Standard) $N_{col}$, $N_{row}$, and $N_{rot}$ parameters defined by the first communication protocol for a communication channel having a 40 MHz bandwidth are utilized. In an embodiment, the new $N_{col}$, $N_{row}$, and $N_{rot}$ parameters are scaled versions of the corresponding $N_{col}$, $N_{row}$, and $N_{rot}$ parameters defined for a 40 MHz channel by a legacy communication protocol (e.g., the IEEE 802.11ac Standard). For example, in an illustrative embodiment, the new $N_{col}$ and $N_{row}$ parameters correspond to the $N_{col}$ and $N_{row}$ parameters, respectively, defined for 40 MHz channel in the IEEE 802.11ac Standard scaled at least approximately by sqrt(N), where sqrt ( ) is a square root function and N is the factor by which the tone spacing is reduced for the 40 MHz bandwidth in the first communication protocol. Further, in an embodiment, one or both of $N_{col}$ and $N_{row}$ are adjusted such a product of $N_{col}$ and $N_{row}$ corresponds to a number of data tones in the 40 MHz bandwidth, in an embodiment. Referring now to the $N_{rot}$ parameter, $N_{rot}$ corresponds to the $N_{rot}$ parameter defined for 40 MHz bandwidth by the IEEE 802.11ac Standard scaled by N, in an example embodiment. In other embodiments, however, other suitable $N_{col}$, $N_{row}$, and $N_{rot}$ parameters different from the corresponding parameters defined by a legacy communication protocol are utilized.

In an embodiment, the parameters $N_{col}$, $N_{row}$, and $N_{rot}$ used for an OFDM symbol being generated for an 80 MHz-wide channel with 1024 point IDFT, new (e.g., not previously defined in the IEEE 802.11ac Standard) $N_{col}$, $N_{row}$, and $N_{rot}$ parameters are utilized. In an embodiment, the new $N_{col}$, $N_{row}$, and $N_{rot}$ parameters are scaled versions of the corresponding parameters defined for an 80 MHz-wide channel in the IEEE 802.11ac Standard, in an embodiment. As an example, in an example embodiment, the new $N_{col}$, $N_{row}$, and $N_{rot}$ parameters correspond to $N_{col}$, $N_{row}$ and $N_{rot}$ defined for an 80 MHz bandwidth by the IEEE 802.11ac Standard and scaled by a factor that is proportional to the reduction in tone spacing with respect to the IEEE 802.11ac Standard. For example, in an illustrative embodiment, the new $N_{row}$ and $N_{row}$ parameters correspond to the $N_{col}$ and $N_{row}$ parameters, respectively, defined for an 80 MHz bandwidth in the IEEE 802.11ac Standard scaled at least approximately by sqrt(N), where sqrt ( ) is a square root function and N is the factor by which the tone spacing is reduced for an 80 MHz bandwidth in the first communication protocol. Further, in an embodiment, one or both of $N_{col}$ and $N_{row}$ are adjusted such a product of $N_{col}$ and $N_{row}$ corresponds to a number of data tones in the 80 MHz bandwidth, in an embodiment. Referring now to the $N_{rot}$ parameter, $N_{rot}$ corresponds to the $N_{rot}$ parameter defined for an 80 MHz bandwidth by the IEEE 802.11ac Standard scaled by N, in an example embodiment. Thus, for example, in an embodiment in which ¼ tone spacing is utilized for an 80 MHz channel, the $N_{col}$, $N_{row}$, and $N_{rot}$ used by the BCC interleavers 520 are $N_{col}$=55 (approximately 26*2), $N_{row}$=18*$N_{BPSCS}$ (2*9*$N_{BPSCS}$), where $N_{BPSCS}$ is the number of coded bits per single carrier for each spatial stream (based on modulation and coding scheme (MCS) being utilized), and $N_{rot}$=58*4 if the number of spatial streams ($N_{ss}$) is less than or equal to 4, or $N_{rot}$=28*4 if the number of spatial streams ($N_{ss}$) is greater than 4, in an embodiment. As another example, in another embodiment, $N_{rot}$=62*4 if the number of spatial streams ($N_{ss}$) is less than or equal to 4, or $N_{rot}$=30*4 or 32*4 if the number of spatial streams ($N_{ss}$) is greater than 4. In other embodiments, however, other suitable $N_{col}$, $N_{row}$, and $N_{rot}$ parameters different from the corresponding parameters defined by a legacy communication protocol are utilized.

In an embodiment in which multiple segments of coded bits corresponding to different frequency sub-bands of the 80 MHz communication channel are operated on by respective multiple BCC interleavers 520, the parameters $N_{col}$, $N_{row}$, and $N_{rot}$ used by the two BCC interleavers 318 correspond to the $N_{col}$, $N_{row}$, and $N_{rot}$ parameters defined by the first communication protocol for the channel corresponding to the sub-band. As just an example, in an embodiment in which four segments of coded bits corresponding to respective 20 MHz sub-bands of the 80 MHz-wide channel are operated on by four BCC interleavers 318, the parameters $N_{col}$, $N_{row}$, and $N_{rot}$ used by the four BCC interleavers 318 correspond to $N_{col}$, $N_{row}$, and $N_{rot}$ parameters, respectively, used for a 20 MHz channel of the first communication protocol (e.g., $N_{col}$, $N_{row}$, and $N_{rot}$ parameters defined for an 80 MHz communication channel by the IEEE 802.11ac Standard), in an embodiment.

In an embodiment in which two segments of coded bits for a 160 MHz communication channel are operated on by two BCC interleavers 520, the parameters $N_{col}$, $N_{row}$, and $N_{rot}$ used by the two BCC interleavers 520 correspond to $N_{col}$, $N_{row}$, and $N_{rot}$, respectively, used for an 80 MHz communication channel as defined in the first communication protocol (e.g., the $N_{col}$, $N_{row}$, and $N_{rot}$ parameters for an 80 MHz communication channel of the first communication protocol defined as described above), in an embodiment. On the other hand, in an embodiment in which an OFDM symbol for a 160 MHz channel is generated using a single segment of coded bits (e.g., the segment parsers 518 are bypassed), new (e.g., not previously defined in the IEEE 802.11ac Standard) $N_{col}$, $N_{row}$, and $N_{rot}$ parameters defined for a 160 MHz channel by the first communication protocol are utilized.

In an embodiment in which the interleavers 520 operate on resource units within an OFDMA data unit, such as the OFDMA data unit 250 of FIG. 2B, the interleavers 520 use interleaving parameters that depend on the number of OFDM tones in a resource unit within the OFDMA data unit. Table 1 illustrates interleaver parameters used by the interleavers 520 for several RU sizes within the data unit 250 of FIG. 2B, in some embodiments.

TABLE 1

| RU (number of tones) | $N_{col}$ | $N_{rot}$ |
|---|---|---|
| 26 | 8 | 2 (Nss ≤ 4) |
| 52 | 16 | K |
| 106 | 17 | 29 (Nss ≤ 4) |
|  |  | 13 (Nss > 4) |
| 242 | 56 | 58 (Nss ≤ 4) |
|  |  | 28 (Nss > 4) |

Referring to Table 1, in several example embodiments, the value K of the parameter $N_{rot}$ used with a resource unit having 52 tones for Nss≤4 is one of K=11, K=13, or K=9, depending on the embodiment. Referring still to Table 1, the value K of the parameter $N_{rot}$ used with a resource unit having 52 tones for Nss>4 is one of K=5, K=6, or K=7, depending on the embodiment. In other embodiments, the value K of the parameter $N_{rot}$ used with a resource unit having 52 tones are other suitable values.

In some embodiments, for example when LDPC encoding is utilized (e.g., when the FEC encoders 312 are LDPC encoders), the BCC interleavers 520 are bypassed or omitted.

With continued reference to FIG. 5, outputs of the BCC interleavers 520 (or outputs of the segment parsers 518 if the BCC interleavers 520 are bypassed or omitted) are provided to constellation mappers 522. In an embodiment, each constellation mapper 522 maps a sequence of bits to constellation points corresponding to different subcarriers/tones of an OFDM symbol. More specifically, for each spatial stream and each segment, a constellation mapper 522 translates every bit sequence of length $\log_2(M)$ into one of M constellation points, in an embodiment. The constellation mapper 522 handles different numbers of constellation points depending on the MCS being utilized. In an embodiment, the constellation mapper 522 is a quadrature amplitude modulation (QAM) mapper that handles M=2, 4, 16, 64, 256, and 1024. In other embodiments, the constellation mapper 522 handles different modulation schemes corresponding to M equaling different subsets of at least two values from the set {2, 4, 16, 64, 256, 1024}.

In an embodiment, when LDPC encoding is utilized, the outputs of the constellation mappers 522 are operated on by LDPC tone mappers 526. In some embodiments, when BCC encoding is utilized (e.g., when the FEC encoders 512 are BCC encoders), the LDPC tone mappers 526 are bypassed or omitted.

Each LDPC tone mapper 526 reorders constellation points corresponding to a spatial stream and a segment according to a tone remapping function. The tone remapping function is generally defined such that consecutive coded bits or blocks of information bits are mapped onto nonconsecutive tones in the OFDM symbol to facilitate data recovery at the receiver in cases in which consecutive OFDM tones are adversely affected during transmission. LDPC tone mapper parameters (e.g., "tone mapping distance" or the distance between two OFDM tones onto which adjacent constellation points are mapped) may be different in different embodiments. In an embodiment, the tone mapping distance used by the LDPC tone mapper 526 for an OFDM symbol being generated for a 20 MHz channel corresponds to the tone mapping distance defined by the IEEE 802.11ac Standard for an 80 MHz channel.

In an embodiment in which multiple segments of constellation points corresponding to multiple sub-bands of a channel are operated on by multiple LDPC tone mappers 526, the tone mapping distance used by each of the operating LDPC tone mappers 526 corresponds to the tone mapping distance defined by the first communication protocol for a channel corresponding to each of the sub-bands. Thus, for example, each LDPC encoder 526 operating on a 20 MHz sub-band of a 40 MHz bandwidth, an 80 MHz bandwidth or a 160 MHz bandwidth utilizes the tone mapping distance defined by the first communication protocol a 20 MHz-wide channel, in an embodiment. In an embodiment, new tone mapping distances, not previously defined by a legacy communication protocol, are defined at least for numbers of OFDM tones that are greater than numbers of OFDM tones used in a legacy communication protocol. For example, in an embodiment, a tone mapping distance $D_1$ defined for a particular bandwidth by the first communication protocol is a scaled version of corresponding tone mapping distance $D_2$ defined for the first bandwidth by a legacy communication protocol (e.g., the IEEE 802.11ac Standard). For example, $D_1$ is at least approximately to $N*D_2$, where N is the tone spacing reduction factor, in an embodiment.

In an embodiment in which the LDPC tone mappers 526 operate on sub-channel blocks corresponding to an OFDMA data unit, such as the OFDMA data unit 250 of FIG. 2B, the LDPC tone mappers 526 use a tone mapping distance D that depends on a size (e.g., number of OFDM tones) of a resource unit within the OFDMA data unit. Further, in some embodiments, tone mapping is not implemented (e.g., the LDPC tone mappers 526 are bypassed or omitted) for some resource unit sizes, in some embodiment.

In an embodiment, a 26-tone RU includes 24 data tones and 2 pilot tones. In other embodiments, a 26-tone RU includes other suitable numbers of data tones and pilot tones. In an embodiment, tone mapping is not implemented for a 26-tone RU, in an embodiment. In another embodiment, tone mapping is not implemented for a 26-tone RU for Nss≤4, and tone mapping is implemented for a 26-tone RU for Nss>4, with a tone mapping distance selected from a set {4, 6, 8}, depending on the embodiment. In another embodiment, another suitable tone mapping distance D for a 26-tone RU for Nss>4 is used.

In an embodiment, a 52-tone RU includes 48 data tones and 4 pilot tones. In other embodiments, a 52-tone RU includes other suitable numbers of data tones and pilot tones. In an embodiment, tone mapping is not implemented for a 52-tone RU. In another embodiment, tone mapping is not implemented for a 52-tone RU for Nss≤4, and tone mapping is implemented for a 52-tone RU for Nss>4, with a tone mapping distance D selected from a set {6, 8, 12}, depending on an embodiment. In another embodiment, another suitable tone mapping distance D for a 52-tone RU for Nss>4 mapping distance D is used. In some embodiments, tone mapping is implemented for a 52-tone RU regardless of the number of spatial or space-time streams $N_{SS}$ being used. In some embodiments in which tone mapping is implemented for a 52-tone RU regardless of the number of spatial or space-time streams $N_{SS}$ being used, tone mapping distance D is selected from a set {6, 8, 12}. In another embodiment in which tone mapping is implemented for a 52-tone RU regardless of the number of spatial or space-time streams $N_{SS}$ being used, another suitable tone mapping distance D is used.

In an embodiment, a 106-tone RU includes 102 data tones and 4 pilot tones. In other embodiments, a 106-tone RU includes other suitable numbers of data tones and pilot tones. In an embodiment, tone mapping is not implemented for a 106-tone RU. In another embodiment, tone mapping is not implemented for a 106-tone RU for Nss≤4, and tone mapping is implemented for a 106-tone RU for Nss>4, with a tone mapping distance D selected from a set {6, 17, 34}, depending on an embodiment. In another embodiment, another suitable tone mapping distance D for a 106-tone RU for Nss>4 mapping distance D is used. In some embodiments, tone mapping is implemented is implemented for a 106-tone RU regardless of the number of spatial or space-time streams Nss being used. In some embodiments in which tone mapping is implemented for a 106-tone RU regardless of the number of spatial or space-time streams Nss being used, tone mapping distance D for a 106-tone RU is selected from a set {6, 17, 34}. In another embodiment in which tone mapping is implemented for a 106-tone RU regardless of the number of spatial or space-time streams Nss being used, another suitable tone mapping distance D is used.

In an embodiment, a 242-tone RU includes 234 data tones and 8 pilot tones. In other embodiments, a 242-tone RU includes other suitable numbers of data tones and pilot tones. In an embodiment, tone mapping is implemented for a 242-tone RU regardless of the number of spatial or space-time streams Nss being used, with tone spacing distance D corresponding to the tone spacing distance D defined for an 80 MHz bandwidth by the IEEE 802.11ac Standard (i.e., D=9). In other embodiments, tone mapping is implemented for a 242-tone RU regardless of the number of spatial or space-time streams Nss being used, with tone spacing distance D selected from a set {18, 26, 36, 39, 52, 78}. In another embodiment in which tone mapping is implemented for a 242-tone RU regardless of the number of spatial or space-time streams Nss being used, another suitable tone mapping distance D is used.

In an embodiment, a 484-tone RU includes 468 data tones and 16 pilot tones. In other embodiments, a 484-tone RU includes other suitable numbers of data tones and pilot tones. In an embodiment, tone mapping is implemented for a 484-tone RU regardless of the number of spatial or space-time streams Nss being used. In an embodiment, the 484 tones are generated using two segments, with tone spacing distance D corresponding to the tone spacing distance D defined for an 80 MHz bandwidth by the IEEE 802.11ac Standard (i.e., D=9) used in each of the segments. In another embodiment, the 484 tones are generated using a single segment. In some such embodiments, tone mapping is implemented regardless of the number of spatial or space-time streams Nss being used, with a tone mapping distance D selected from a set {9, 18, 26, 36, 39, 52, 78}. In another embodiment in which tone the 484 tones are generated as a single segment, another suitable tone mapping distance D is used.

In an embodiment, a 996-tone RU includes 980 data tones and 16 pilot tones. In other embodiments, a 996-tone RU includes other suitable numbers of data tones and pilot tones. Tone mapping is implemented for a 996-tone RU regardless of the number of spatial or space-time streams Nss being used, with a tone mapping distance D selected from a set {35, 49, 70, 98}, in various embodiments. In another embodiment, another suitable tone mapping distance D is used.

Outputs of LDPC tone mappers 526 corresponding to respective spatial stream (or, if the LDPC tone mappers 526 are bypassed or omitted, outputs of constellation mappers 522 corresponding to respective spatial streams) are provided to respective segment deparsers 528. Each segment deparser 528 merges the outputs of the LDPC tone mappers 526 (or the constellation mappers 522 if the LDPC tone mappers 526 are bypassed or omitted) corresponding to a spatial stream.

The space-time block coding (STBC) unit 530 receives the constellation points corresponding to the one or more spatial streams and spreads the spatial streams to a number ($N_{STS}$) of space-time streams. In some embodiments, the STBC unit 530 is omitted. Cyclic shift diversity (CSD) units 532 are coupled to the STBC unit 530. The CSD units 532 insert cyclic shifts into all but one of the space-time streams (if more than one space-time stream) to prevent unintentional beamforming. For ease of explanation, the inputs to the CSD units 532 are referred to as space-time streams even in embodiments in which the STBC unit 530 is omitted.

The spatial mapping unit 536 maps the $N_{STS}$ space-time streams to $N_{TX}$ transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation points from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains. Each output of the spatial mapping unit 536 corresponds to a transmit chain, and each output of the spatial mapping unit 536 is operated on by an IDFT calculation unit 540 (e.g., an inverse fast Fourier transform (IFFT) calculation unit) that converts a block of constellation points to a time-domain signal. In an embodiment in which the PHY processing unit 500 includes multiple processing paths 501 corresponding to multiple receivers of an OFDMA data unit, each IDFT calculation unit 540 includes multiple inputs corresponding to outputs of the multiple processing paths 501. In this embodiment, each IDFT calculation unit 540 jointly performs IDFT for all of the receivers on the OFDMA data unit.

Outputs of the IDFT units 540 are provided to GI insertion and windowing units 544 that prepend to OFDM symbols, a guard interval (GI) portion, which is a circular extension of an OFDM symbol in an embodiment, and smooth the edges of OFDM symbols to increase spectral delay. Outputs of the GI insertion and windowing units 544 are provided to analog and radio frequency (RF) units 548 that convert the signals to analog signals and upconvert the signals to RF frequencies for transmission. The signals are transmitted in a 20 MHz, a 40 MHz, an 80 MHz, or a 160 MHz bandwidth channel (e.g., corresponding to a 256-, 512-, 1024-, or 2048-point IDFT at unit 540, respectively, in an embodiment, and utilizing a clock rate that is constant regardless of IDFT size), in various embodiments and/or scenarios. In other embodiments, other suitable channel bandwidths (and/or IDFT sizes) are utilized.

In various embodiments, the PHY processing unit 500 includes various suitable numbers of transmit chains (e.g., 1, 2, 3, 4, 5, 6, 7, etc.). Further, in some scenarios, the PHY processing unit 500 does not utilize all transmit chains. As merely an illustrative example, in an embodiment in which the PHY processing unit 500 includes four transmit chains, the PHY processing unit 500 may utilize only two transmit chains or only three transmit chains, for example, if only two spatial streams are being utilized.

In the PHY processing unit 500, each transmit chain is configured to generate a transmit signal that spans the entire communication channel (e.g., spanning 20 MHz, 40 MHz, 80 MHz, 160 MHz, etc.). In other embodiments, however, the network interface device (e.g., network interface device 16 and/or network interface device 27) includes multiple radio frequency (RF) portions corresponding to different portions of the communication channel. For example, multiple portions are used For instance, as merely an illustrative example, the network interface device includes a first RF portion corresponding to first 20 MHz-wide portion of a 40 MHz-wide communication channel, and a second RF portion corresponding to second 20 MHz-wide portion of the 20 MHz-wide communication channel. As just another example, in another embodiment, the network interface device includes a first RF portion corresponding to first 80 MHz-wide portion of a 160 MHz-wide communication channel, and a second RF portion corresponding to second 80 MHz-wide portion of the 160 MHz-wide communication channel.

Figure 6:
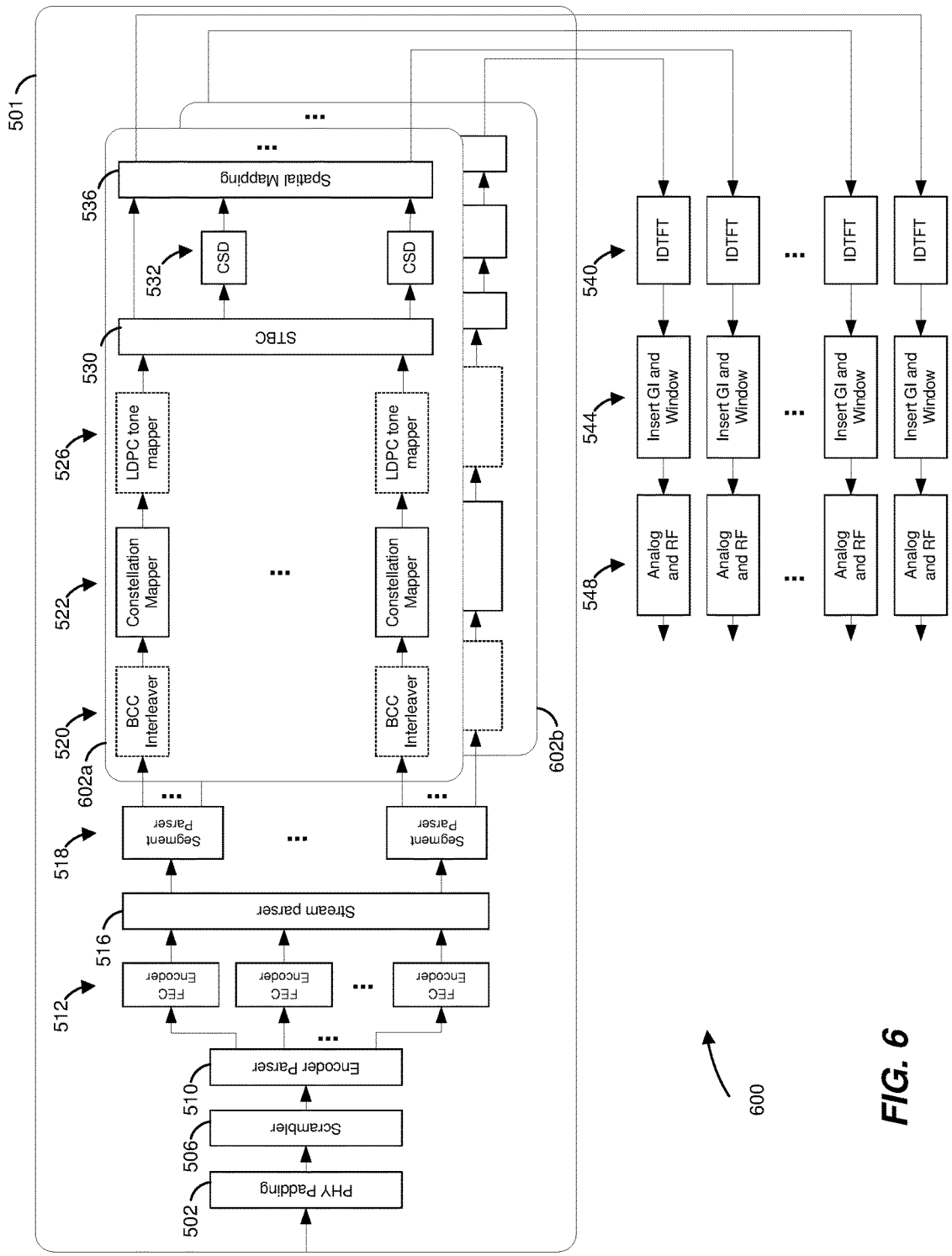
FIG. 6 is a block diagram of another PHY processing unit, according to another embodiment.

FIG. 6 is a block diagram of a transmit portion of an example PHY processing unit 600 configured to generate data units, such as the data unit 200 of FIG. 2A or the data unit 250 of FIG. 2B, that conform to the first communication protocol, according to an embodiment. Referring to FIG. 1, the PHY processing unit 20 of AP 14 and the PHY processing unit 29 of client station 25-1 are each similar to or the same as PHY processing unit 600, in one embodiment. The PHY processing unit 600 is similar to the PHY processing unit 500 of FIG. 5 and includes many of the same elements of the PHY processing unit 500. At least some of like-numbered elements with the PHY processing unit 500 are not discussed in detail merely for purposes of brevity.

The PHY processing unit 600 includes a respective processing unit 508 corresponding to each segment of multiple segments generated to by the segment parsers 402 and, accordingly, corresponding to each frequency sub-band of the communication channel, in an embodiment. For example, a first processing unit 508 corresponds to a first frequency sub-band of the communication channel, and a second processing unit corresponds to a second frequency sub-band of the communication channel. Additionally, the PHY processing 600 does not utilize a segment deparser.

As just an example, in a transmission mode corresponding to a communication channel having a width of 40 MHz, the first processing unit 602a may correspond to a first 20 MHz frequency sub-band and the second processing unit 602b may correspond to a second 20 MHz frequency sub-band of the communication channel. As just another example, in a transmission mode corresponding to a communication channel having a width of 160 MHz, the first processing unit 602a may correspond to a first 80 MHz frequency sub-band and the second processing unit 602b may correspond to a second 80 MHz frequency sub-band of the communication channel. In some embodiments and/or scenarios, the first frequency sub-band is contiguous with the second frequency sub-band. In other embodiments and/or scenarios, however, the first frequency sub-band is not contiguous with the second frequency sub-band. For example, there may be a gap in frequency between the first frequency sub-band and the second frequency sub-band, and the communication channel has a cumulative bandwidth equal to a sum of the bandwidth of the first frequency sub-band and the bandwidth of the second frequency sub-band, in an embodiment.

The first processing unit 602a includes a respective BCC interleaver 520 (if BCC interleavers 520 are not omitted), a respective constellation mapper 522 and a respective LDPC tone mapper 526 (if LDPC tone mappers 526 are not omitted) for each spatial stream. The first processing unit 508a further includes the STBC unit 530, the CSD units 532 and the spatial mapping unit 526. Referring to the outputs of the spatial mapping unit 536, each modulation data output of the spatial mapping unit 536 of the first processing unit 508a corresponds to a respective transmit channel, and also corresponds to single portion of the communication channel. As merely an illustrative example, in an embodiment and/or transmission mode in which a 160 MHz communication channel is to be utilized, a modulation data output provided to a first transmit chain corresponding to each spatial stream corresponds to a first 80 MHz portion of the 160 MHz communication channel. Continuing with the illustrative example above, in an embodiment, a modulation data output provided to a second transmit chain corresponding to each spatial stream corresponds to a second 80 MHz portion of the 160 MHz communication channel.

The block of constellation points operated on by each IDFT calculation unit 540 corresponds to all of the subcarriers corresponding to the respective portion of the communication channel. Thus, in an example embodiment and/or transmission mode in which a 160 MHz communication channel is to be utilized, each IDFT calculation unit 540 implements a 1024-point IDFT corresponding to 1024 subcarriers of an 80 MHz bandwidth portion of the communication channel. The signals output by each block 548 span only the respective bandwidth portion of the communication channel (e.g., a respective 80 MHz-wide portion of a 160 MHz-wide communication channel), in an embodiment.

Figure 7:
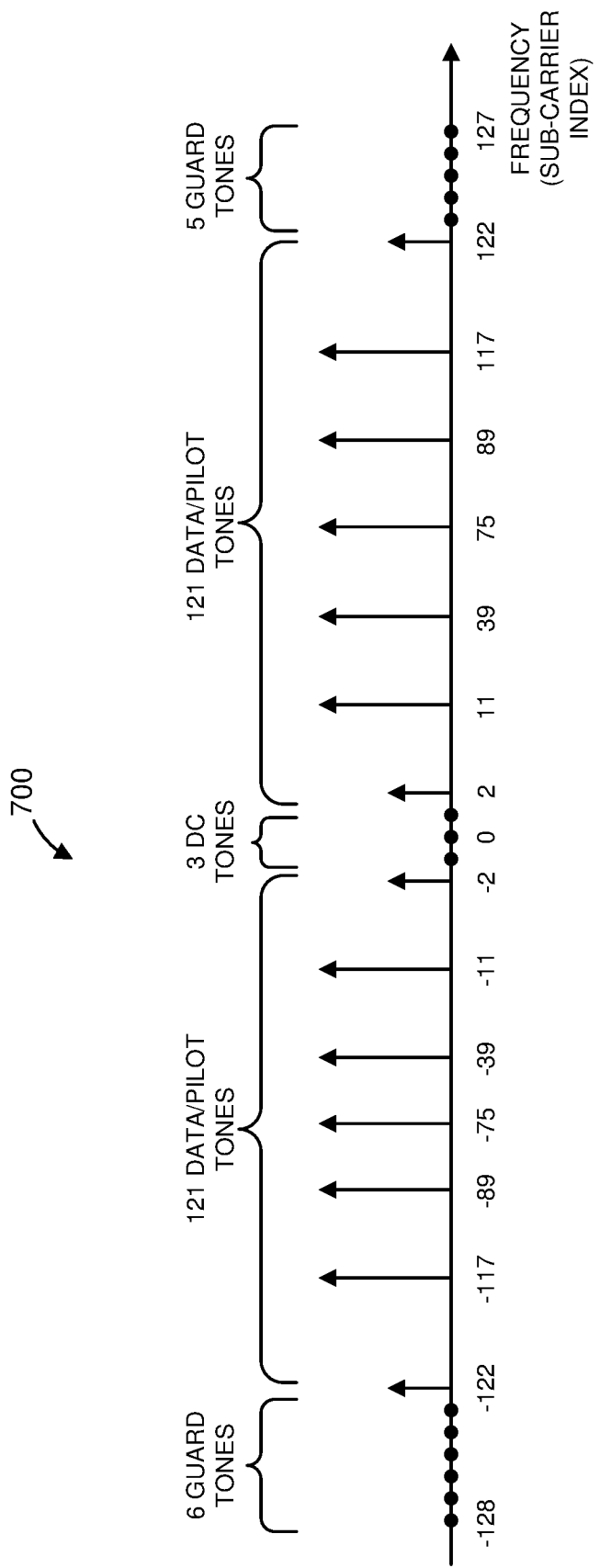
FIGS. 7-9 are tone maps corresponding to OFDM symbols, in several embodiments.
Figure 8:
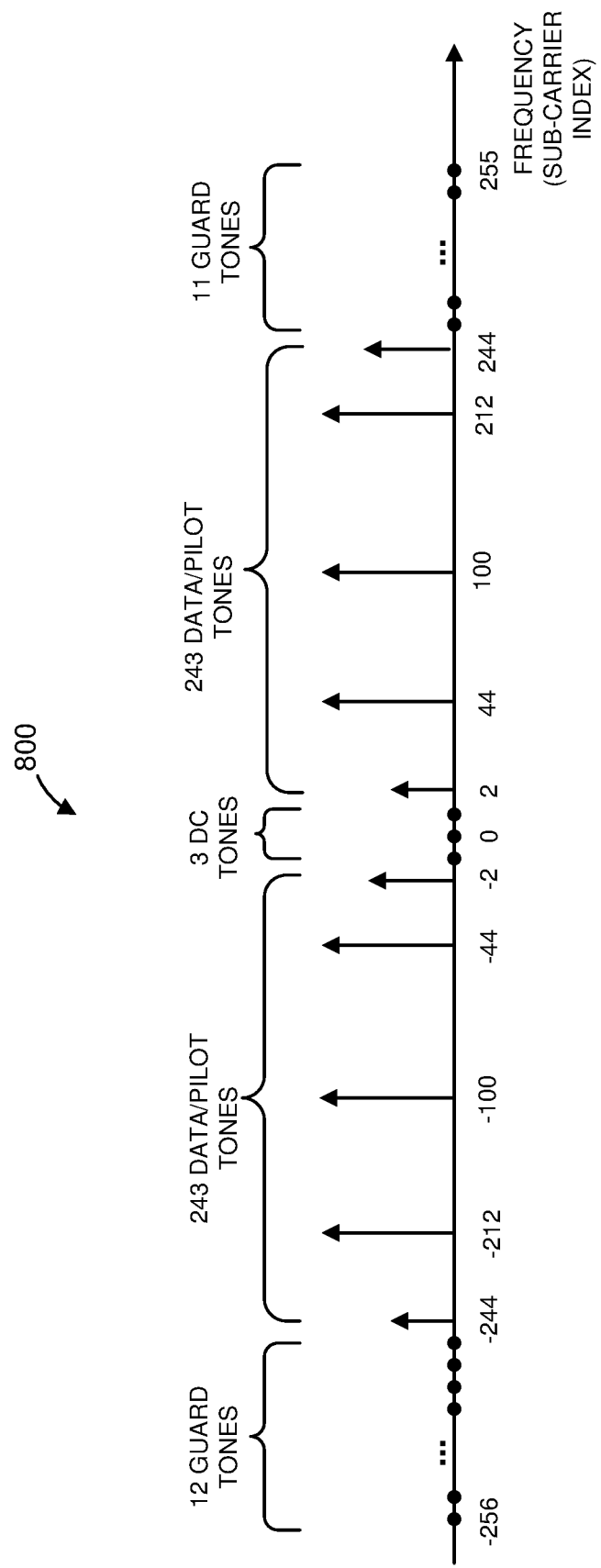
Figure 9:
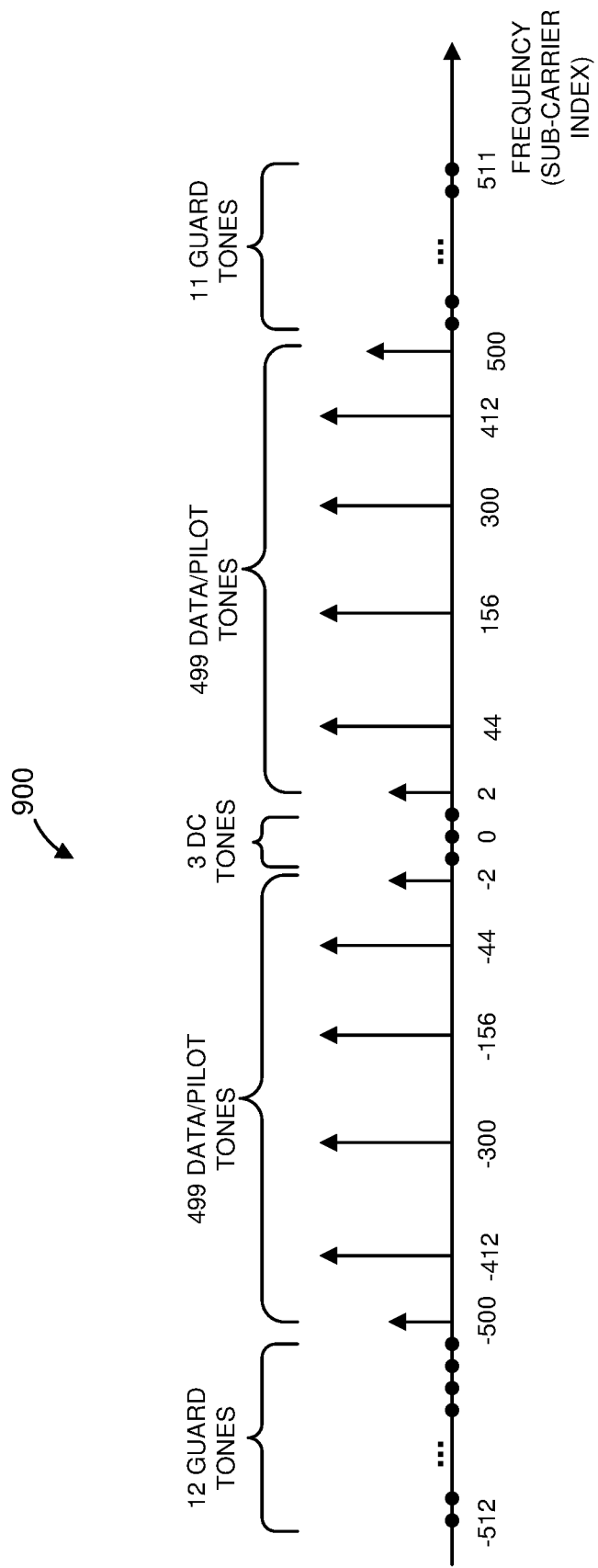

FIGS. 7-9 are diagrams of tone maps corresponding to OFDM symbols that are generated according to the first communication protocol, in some embodiments. The PHY unit 200 (FIG. 3) is configured, in some embodiments, to generate OFDM symbols such as one of the OFDM symbols of FIGS. 7-9, or another suitable OFDM symbol. In some embodiments, PHY unit 200 (FIG. 3) is configured to generate different OFDM symbols, such as the OFDM symbols of FIGS. 7-9, or other suitable OFDM symbols, depending on channel conditions, the capabilities of the receive device to which the OFDM symbol is being transmitted, etc.

FIG. 7 is a diagram of a tone map for an OFDM symbol 700 corresponding to a 20 MHz-wide channel, according to an embodiment. The OFDM symbol 700 includes 256 OFDM tones with a tone spacing that is reduced by a factor of 4 (¼ tine spacing) as compared to tone spacing defined by the IEEE 802.11ac Standard, in an embodiment. The OFDM symbol 700 has the same format as specified for an 80 MHz communication channel in the IEEE 802.11ac Standard.

The 256 tones of the OFDM symbol 700 are indexed from −128 to +127, in an embodiment. The 256 tones include 11 guard tones, three direct current (DC) tone, data tones, and pilot tones. The six lowest frequency tones and the five highest frequency tones are guard tones, which are provided for filter ramp up and ramp down, in an embodiment. In an embodiment, the number of guard tones included in an OFDM symbol conforming to the first communication protocol is scaled with respect to the number of guard tones defined for the corresponding bandwidth by the IEEE 802.11ac Standard so as to maintain at least substantially same frequency guard band as the corresponding guard band defined by the IEEE 802.11ac Standard. For example, the number of guard tones at each band edge of an OFDM symbol conforming to the first communication protocol corresponds to the number of guard tones defined by the IEEE 802.11ac Standard scaled by In another embodiment, the number of guard tones included in the OFDM symbol 700 is greater than the number of guard tones defined for an 80 MHz bandwidth by the IEEE 802.11ac Standard. For example, the number of guard tones in the OFDM symbol is scaled with respect to the number of guard tones defined by IEEE 802.11ac Standard by the scaling factor N when the tone spacing is reduced by a factor of 1/N with respect to the IEEE 802.11ac Standard. Thus, for example, for an OFDM symbol with ¼ tone spacing as compared to the tone spacing defined by the IEEE 802.11ac Standard, the number of guard tones at a band edge of the OFDM symbol corresponds to the number of guard tones at the corresponding band edge defined by the IEEE 802.11ac Standard multiplied by 4, in an embodiment. Accordingly, in this embodiment, the number of guard tones at the lower and upper band edges corresponds to [6, 5] *4. In another embodiment, the number of guard tones at each band edge is scaled by a factor that is less than N. For example, more stringent filtering is used to transmit/receive OFDM symbols conforming to the first communication protocol as compared to filtering used transmit/receive OFDM symbols conforming to the IEEE 802.11ac Standard, in some embodiments. Generally speaking, the number of guard tones in an OFDM symbol conforming to the first communication protocol is less than or equal to [6, 5] *N, in various embodiments. As a more specific example, the number of guard tones at the left band edge ($N_{G\ left}$) of an OFDM symbol conforming to the first communication protocol is within the range $2 \leq N_{G\ left} \leq 6*N$, and the number of guard tones at the right band edge ($N_{G\ right}$) of an OFDM symbol conforming to the first communication protocol is within the range $3 \leq N_{G\ right} \leq 5*N$. Further, in an embodiment, the number of guard tones $N_{G\ left}$ and $N_{G\ right}$ in an OFDM symbol that conforms to the first communication protocol is such that the condition $N_{G\ right} = N_{G\ left}+1$ is satisfied.

Referring again to FIG. 7, the index −1, 0, and +1 tones in the OFDM symbol 700 are DC tones, which are provided for mitigating radio frequency interference. In the embodiment of FIG. 7, the number of DC tones (i.e., 3 DC tones) included in the OFDM symbol 700 corresponds to the number of DC tones defined for a 20 MHz channel by the IEEE 802.11ac Standard. In an embodiment, due to the smaller tone spacing in the OFDM symbol 700 as compared to tone spacing defined by the IEEE 802.11ac Standard, the first communication protocol defines a maximum tolerable transmitter-receiver (Tx-Rx) frequency offset that is less than the tolerable Tx-Rx frequency offset defined in the IEEE 802.1 ac Standard. For example, whereas the maximum tolerable Tx-Rx frequency offset defined by the IEEE 802.11ac Standard is ±40 parts per million (ppm), the first communication protocol defines a smaller maximum tolerable Tx-Rx frequency offset such as ±20 parts per million (ppm), for example. Additionally or alternatively, the OFDM symbol 700 includes a number of DC tones that is greater than three DC tones, in some embodiments. For example, in an embodiment, the OFDM symbol 700 includes five DC tone. In other embodiments, the OFDM symbol 700 includes other suitable numbers of DC tones (e.g., 1, 7, 9, 11, etc.). Greater number of DC tones (e.g., 5 DC tones) allows the first communication protocol to maintain the maximum tolerable Tx-Rx frequency offset requirement at least substantially the same as defined by the IEEE 802.11ac Standard (i.e., +/−40 parts per million (ppm)) while utilizing the reduced tone spacing, such as ¼ tone spacing, in the OFDM symbol 700.

With continued reference to FIG. 7, the OFDM symbol 700 includes 10 pilot tones at tone indices {±117, ±89, ±75, ±39, ±11}, in the illustrated embodiment. In an embodiment, the pilot tones are used for frequency offset estimation, for example. The number and locations of pilot tones of the OFDM symbol 700 corresponds to the number and locations of pilot tones defined for an 80 MHz bandwidth by the IEEE 802.11ac Standard, in this embodiment. In another embodiment, the number of pilot tones in an OFDM symbol conforming to the first communication protocol corresponds to the number of pilot tones defined for a corresponding bandwidth in the IEEE 802.11ac Standard. Accordingly, in an embodiment, although an OFDM symbol corresponding to a particular bandwidth and conforming to the first communication protocol includes a greater number of OFDM tones as compared to an OFDM symbol corresponding to the particular bandwidth and conforming to the IEEE 802.11ac Standard, the OFDM symbol conforming to the first communication protocol includes the same number of pilot tones as the OFDM symbol corresponding to the same bandwidth and conforming to the IEEE 802.11ac Standard. In an embodiment, the locations of the pilot tones correspond to the pilot tone locations defined for the corresponding bandwidth in the IEEE 802.11ac Standard scaled by the scaling factor N when the tone spacing is reduced by a factor of 1/N with respect to the IEEE 802.11ac Standard. As just an example, the OFDM symbol 700, which correspond to a 20 MHz-wide channel and conforms to the first communication protocol with ¼ tone spacing, includes four pilot tones located at indices {±28, ±84}, in another embodiment. As just another example, an OFDM symbol that corresponds to a 40 MHz-wide channel and conforms to the first communication protocol with ¼ tone spacing includes 512 OFDM tones, of which six tones, located at indices {±44, ±100, ±212}, are pilot tones, in an embodiment.

Referring still to FIG. 7, the OFDM tones in the tone map 700 that are not used as DC tones, guard tones, or pilot tones as used as data tones, in an embodiment. In some embodiments, the number of OFDM tones used as data tones is selected such that the number of data tones is divisible by 3 and 6. In such embodiments, the OFDM symbol includes an integer number of data bits per OFDM symbol ($N_{DBPS}$) for all or most modulation and coding schemes defined by the first communication protocol. The integer $N_{DBPS}$ is required or desired when BCC encoding is used to encode the data bits, in an embodiment. On the other hand, when LDPC encoding is used, an integer $N_{DBPS}$ is not needed, and any suitable number of OFDM tones can be used as data tones, in an embodiment.

In some embodiment, the first communication protocol excludes MCSs that do not lead to an integer $N_{DBPS}$ from consideration, at least when BCC encoding is being utilized. In another embodiment, the first communication protocol utilizes a suitable technique that allows a non-integer $N_{DBPS}$ to be encoded using one or more BCC encoders or using an LDPC encoder. Some example techniques used in some embodiments for encoding non-integer $N_{DBPS}$ using one or more BCC encoders is described, for example, in U.S. patent application Ser. No. 13/246,577, entitled "Parsing and Encoding Methods in a Communication System," filed Sep. 27, 2011, which is hereby incorporated by reference in its entirety. Some example techniques used in some embodiments for encoding non-integer $N_{DBPS}$ using an LDPC encoder is described, for example, in U.S. patent application Ser. No. 13/439,623, entitled "Data Encoding Methods in a Communication System," filed Apr. 4, 2012, which is hereby incorporated by reference in its entirety. In an embodiment, BCC encoding is not used in the first communication protocol, and only LDPC encoding in allowed.

FIG. 8 is a diagram of a tone map for an OFDM symbol 800 corresponding to a 40 MHz-wide channel, according to an embodiment. The OFDM symbol 800 includes 512 tones indexed from −256 to +255, in an embodiment. The 512 tones include guard tones, DC tones, data tones, and pilot tones. The 12 lowest frequency tones and the 11 highest frequency tones are guard tones. The three tones indexed from −1 to +1 are DC tones. The OFDM symbol 800 includes 486 data/pilot tones, of which six tones are pilot tones as defined for a 40 MHz-wide channel by the IEEE 802.11ac Standard. The pilot tone locations correspond to the pilot tone locations defined for a 40 MHz-wide channel by the IEEE 802.11ac Standard scaled by a factor of 4, in the illustrated embodiment. In particular, the pilot tones are located at indices {±44, ±100, ±212} in the illustrated embodiment. The OFDM symbol 800 includes 480 data tones. Accordingly, the number of data tones is divisible by 3, 4 and 6. As a result, an integer number of $N_{DBPS}$ requirement is satisfied for all or most modulation and coding schemes defined by the first communication protocol, in an embodiment. Whereas data tone efficiency in a 40 MHz-wide channel according to the IEEE 802.11ac Standard is approximately 84.38% (108 data tones/128 total tones), data tone efficiency on the OFDM symbol 800 is approximately 93.75% (480 data tones/512 total tones), in the illustrated embodiment.

As just another example, an OFDM symbol that corresponds to an 80 MHz corresponds to a size 512 IDFT and includes 512 tones, in an embodiment. Accordingly, the OFDM symbol utilizes ½ tone spacing with respect to the tone spacing defined by the IEEE 802.11ac Standard, in this embodiment. The 512 tones, indexed −512 to 511, include guard tones, DC tones, data tones, and pilot tones. 11 lowest frequency tones and the 12 highest frequency tones are guard tones. Three tones indexed from −1 to +1 are DC tones. The OFDM symbol includes eight pilot tones, as defined for an 80 MHz-wide channel by the IEEE 802.11ac Standard. The pilot tone locations correspond to the pilot tone locations defined for an 80 MHz-wide channel by the IEEE 802.11ac Standard scaled by a factor of 2, in an embodiment. In particular, the pilot tones are located at indices {±22, ±78, ±150, ±206}, in an embodiment. The OFDM symbol includes 480 data tones. Whereas data tone efficiency in an 80 MHz-wide channel according to the IEEE 802.11ac Standard is approximately 91.41% (234 data tones/256 total tones), data tone efficiency on the that corresponds to an 80 MHz corresponds to a size 512 IDFT and includes 512 tones is approximately 93.75% (480 data tones/512 total tones), in an embodiment.

FIG. 9 is a diagram of a tone map for an OFDM symbol 900 corresponding to an 80 MHz-wide channel, according to an embodiment. The OFDM symbol 900 includes 1024 tones indexed from −512 to +511, in an embodiment. The 1024 tones include guard tones, DC tones, data tones, and pilot tones. The 12 lowest frequency tones and the 11 highest frequency tones are guard tones. The three tones indexed from −1 to +1 are DC tones. The OFDM symbol 900 includes 998 data/pilot tones, of which eight tones are pilot tones as defined for an 80 MHz-wide channel by the IEEE 802.11ac Standard. The pilot tone locations correspond to the pilot tone locations defined for an 80 MHz-wide channel by the IEEE 802.11ac Standard scaled by a factor of 4, in the illustrated embodiment. In particular, the pilot tones are located at indices {±44, ±156, ±300, ±412}, in the illustrated embodiment. The OFDM symbol 900 includes 990 data tones. Accordingly, the number of data tones is divisible by 3 and 6, in this embodiment. As a result, an integer number of $N_{DBPS}$ requirement is satisfied for all or most modulation and coding schemes defined by the first communication protocol, in an embodiment. Whereas data tone efficiency in an 80 MHz-wide channel according to the IEEE 802.11ac Standard is approximately 91.41% (234 data tones/256 total tones), data tone efficiency on the OFDM symbol 900 is approximately 96.68% (990 data tones/1024 total tones), in the illustrated embodiment.

In some embodiments, an OFDM symbol for a 40 MHz channel corresponds to two concatenated 20 MHz OFDM symbols. For example, an OFDM symbol for a 40 MHz-wide channel, according to an embodiment, corresponds to a size 512 IDFT (or two 128 IDFTs). The OFDM symbol for a 40 MHz-wide channel corresponds to two concatenated 20 MHz OFDM symbols 700 of FIG. 7, in an embodiment. Similarly, an OFDM symbol for a 160 MHz-wide channel corresponds to two concatenated 80 MHz OFDM symbols, in an example embodiment. For example, the OFDM symbol for a 160 MHz-wide channel corresponds to two concatenated 80 MHz OFDM symbols 900 of FIG. 9, in an example embodiment. Alternatively, in another embodiment, an OFDM symbol that corresponds to a 160 MHz-wide channel is generated using a single segment of coded bits and a size 2048 IDFT (with an OFDM symbol that utilizes ½ tone spacing) or a size 1024 IDFT (with an OFDM symbol that utilizes ½ tone spacing). In an embodiment, the OFDM symbol that corresponds to a 160 MHz-wide channel and is generated using a single segment of coded bits includes guard tones, DC tones and pilot tones. In an embodiment, an OFDM symbol that corresponds to a 160 MHz-wide channel and conforms to a single segment format of the first communication protocol includes less pilot tones as compared to a compound 160 MHz OFDM symbol that conforms to the IEEE 802.11ac Standard. For example, an OFDM symbol an OFDM symbol that corresponds to a 160 MHz-wide channel and conforms to a single segment format of the first communication protocol includes ten pilot tones that are at least approximately equally spaced across the 160 MHz bandwidth. In an embodiment, pilot tone locations defined for a 160 MHz-wide channel by the first communication protocol are divisible by 4. In another embodiment, however, pilot tone locations defined for a 160 MHz-wide channel by the first communication protocol are not necessarily divisible by 4.

As just an example, an OFDM symbol that corresponds to a 160 MHz-wide channel and size 2048 IDFT (¼ tone spacing) includes 2048 tones, in an embodiment. The 2048 tones, indexed −1024 to 1023, include guard tones, DC tones, data tones, and pilot tones. 13 lowest frequency tones and the 12 highest frequency tones are guard tones. Three tones indexed from −1 to +1 are DC tones. The 2048 tones further include 10 pilot tones, in an embodiment. The 10 pilot tones are at least approximately equally spaced over the 160 MHz bandwidth, in an embodiment. In an embodiment, pilot tone locations of the 10 pilot tones are divisible by 4. In another embodiment, however, pilot tone locations of the 10 pilot tones are not necessarily divisible by 4. The 2048 tones include 2010 data tones, in an embodiment. The number of data tones is divisible by 3 and 6, in this embodiment. Data tone efficiency is approximately 98.14% (2010 data tones/1048 total tones), in this embodiment.

Figure 10:
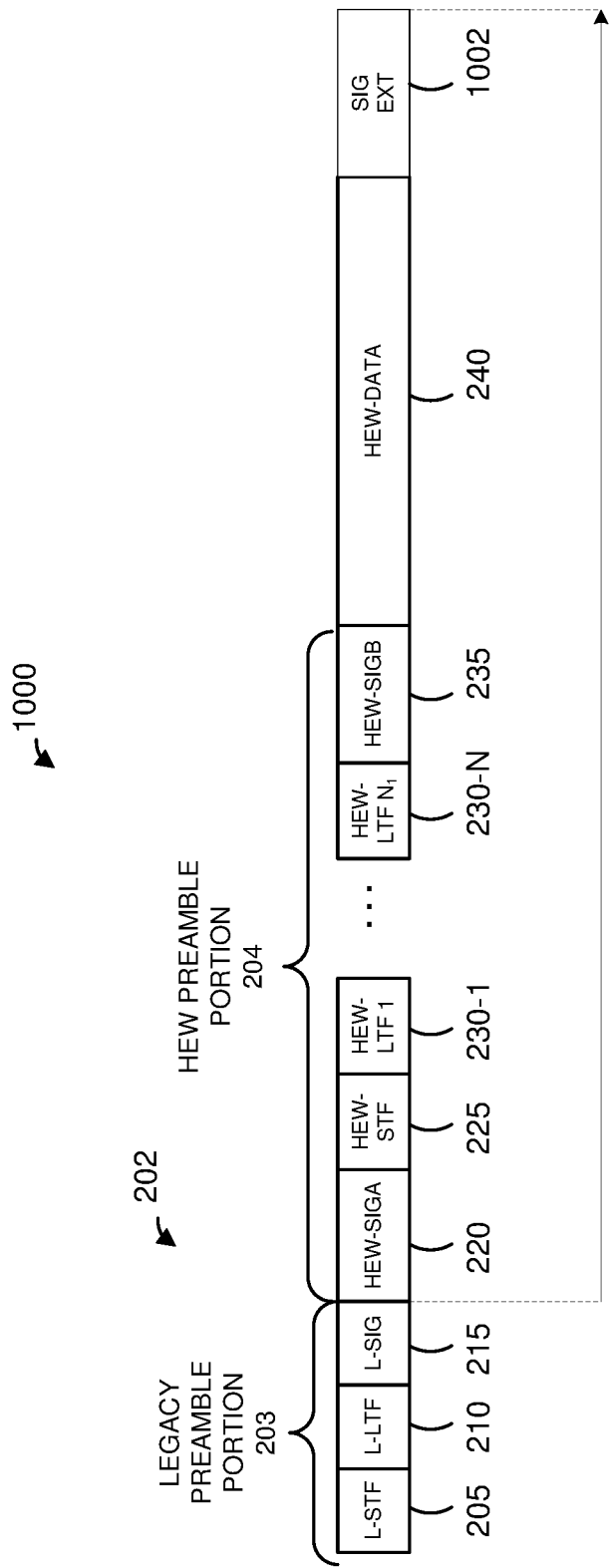
FIG. 10 is a diagram of a PHY data unit, according to an embodiment.

FIG. 10 is a diagram of a PHY data unit 1000 that the AP 14 is configured to transmit to a client station (e.g., the client stations 25-1) via OFDM modulation, according to an embodiment. In an embodiment, the client station 25-1 is also configured to transmit the data unit 1000 to the AP 14. In an embodiment, PHY processing units such as the PHY processing unit 500 of FIG. 5 or the PHY processing unit 600 of FIG. 6 are configured to generate the data unit 1000. In other embodiments, however, the data unit 1000 is generated by a PHY processing unit different from the PHY processing unit 500 of FIG. 5 or the PHY processing unit 600 of FIG. 6.

The OFDM data unit 1000 is similar to the OFDM data unit 200 of FIG. 2A and includes many of the same elements of the OFDM data unit 200 of FIG. 2A. At least some of like-numbered elements with the OFDM data unit 200 of FIG. 2A are not discussed in detail merely for purposes of brevity. Additionally, the OFDM data unit 1000 includes a signal extension (SE) field 1002. The SE field 1002 follows the data field 204, in the illustrated embodiment. In an embodiment, the SE field 1002 is provides extra time that a receiver of the data unit 1000 may use decode an end of the data unit 1000 before transmitting an acknowledgement to acknowledge successful (or unsuccessful) receipt of the data unit 1000. For example, according to the first communication, the receiving device transmits the acknowledgement signal after a certain time period, such as a short interframe space (SIFS) of 16 μs, in an embodiment. However, due to reduced tone spacing and higher data efficiency of the first communication protocol, the receiving device needs to process and decode a relatively larger number of bits in each OFDM symbol of the data field 240 of the data unit 1000, particularly when the data unit 1000 is transmitted in a transmission mode corresponding to a relatively larger bandwidth (e.g., 80 MHz, 160 MHz, etc.) and/or using a modulation and coding scheme (MCS) with relatively larger modulation order and/or relatively high coding rate ("high order MCS"), in at least some embodiments and/or scenarios. In an embodiment, the SE field 1002 is of a suitable length to provide a sufficiently long time to allow the receiving device to process and decode OFDM symbols of the data portion 240, and to prepare an acknowledgement frame, prior to expiration of the certain time period (e.g., SIFS) after the end of the data unit 1000. In an embodiment, the receiver is aware, for example a priori before receiving the data unit 1000, or after decoding a preamble (e.g., the HEW-SIGA field 220 and/or the HEW_SIGB field 235) of the data unit 1000, of the presence and the length of the SE field 1002 in the data unit 1000. Further, a length indication in the L-SIG field 215 indicative of a length of the data unit 1000 after the L-SIG field 215 indicates a length that includes the SE field 1002, in an embodiment. The receiving device, however, need not process and/or decode the SE field 1002, in an embodiment.

In an embodiment, the SE field 1002 includes a set of "zero" bits. In another embodiment, the SE field 1002 includes any suitable "junk" bits. In an embodiment, the junk bits of the SE field 1002 are provided to maintain the same PAPR as in the data portion 240. In an embodiment, the SE field 1002 includes one or more OFDM symbols generating using a normal tone spacing and a regular guard interval of 0.8 μs. In this embodiment, the duration of each of one or more OFDM symbols of the SE field 1002 is 4 μs. In other embodiments, however, one or more OFDM symbols of the SE field 1002 are generated with a suitable tone spacing different from the normal tone spacing and/or with a guard interval different from the regular guard interval. In at least some such embodiments, the duration of each of the one or more OFDM symbols generated with a suitable tone spacing different from the normal tone spacing and/or with a guard interval different from the regular guard interval is a value different from 4 vs. In some embodiments, a power boost is provided for the SE field 1002 to maintain power that is the same as or similar to the power of the data portion 240.

In an embodiment, an SE field, such as the SE field 1002, is used with data units conforming to all transmission modes (e.g., all channel bandwidths and all modulation and coding schemes) defined by the first communication protocol. Alternatively, in another embodiment, an SE field such as the SE field 1002 is used with data units conforming to only some transmission modes (e.g., with only some combinations of channel bandwidths and modulation and coding schemes) defined by the first communication protocol. As just an illustrative example, an SE field such as the SE field 1002 is used only with 80 MHz-wide and 160 MHz-wide channels, in an embodiment. As another example, an SE field such as the SE field 1002 is used only with 80 MHz-wide and 160 MHz-wide channels and additionally with only one or more high order modulation and coding schemes. In an embodiment, a transmitting device determines whether or not to include an SE field in a data unit, and indicates presence or absence of an SE field in a preamble of the data unit. For example, the HEW-SIGA field 220 or the HEW-SIGB field 235 of the data unit 1000 includes an indication (e.g., a single bit) that indicates presence or absence of an SE field in the data unit 1100, in an embodiment.

Figure 11:
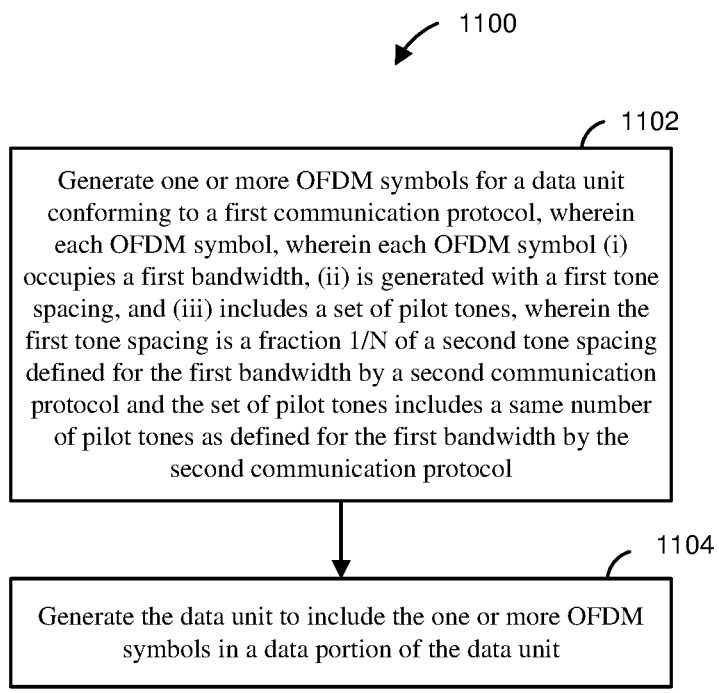
FIG. 11 is a flow diagram of a method for generating a data unit, according to an embodiment.

FIG. 11 is a flow diagram of an example method 1100 for generating a data unit, according to an embodiment. With reference to FIG. 1, the method 1100 is implemented by the network interface device 16, in an embodiment. For example, in one such embodiment, the PHY processing unit 20 is configured to implement the method 1100. According to another embodiment, the MAC processing 18 is also configured to implement at least a part of the method 1100. With continued reference to FIG. 1, in yet another embodiment, the method 1100 is implemented by the network interface device 27 (e.g., the PHY processing unit 29 and/or the MAC processing unit 28). In other embodiments, the method 1100 is implemented by other suitable network interface devices.

At block 1102, one or more OFDM symbols for a data unit conforming to a first communication protocol are generated. Each OFDM symbol occupies a first bandwidth, is generated with a first tone spacing, and includes a set of pilot tones, in an embodiment. In an embodiment, the first tone spacing is a reduced tone spacing with respect to a tone spacing defined for the first bandwidth by a second communication protocol. As an example, the first tone spacing corresponds to the reduced tone spacing 350 of FIG. 3C whereas the second tone spacing corresponds to the normal tone spacing 300 of FIG. 3A. In this embodiment, the first tone spacing is reduced by a factor ¼ with respect to the second tone spacing. As a result, an OFDM symbol generated at block 1102 includes a greater number of tones (scaled by a factor of 4) as compared to OFDM symbols generated for the first bandwidth according to the second communication protocol. On the other hand, the set of pilot tones included in the OFDM symbol is the same as the number of pilot tones defined for the first bandwidth by the second communication protocol, in an embodiment. In an embodiment, the first communication protocol is the HEW communication protocol and the second communication protocol is the IEEE 802.11ac Standard. In another embodiment, the first communication protocol and/or the second communication protocol is another suitable communication protocol.

At block 1104, the data unit is generated. In an embodiment, one of the data unit 200 of FIG. 2A or the data unit 1000 of FIG. 10 is generated. In another embodiment, another suitable data unit is generated. The data unit is generated to include the one or more OFDM symbols generated at block 1102, in an embodiment. The data unit is generated to include the one or more OFDM symbols generated at block 1102 in a data portion of the data unit, in an embodiment.

Figure 12:
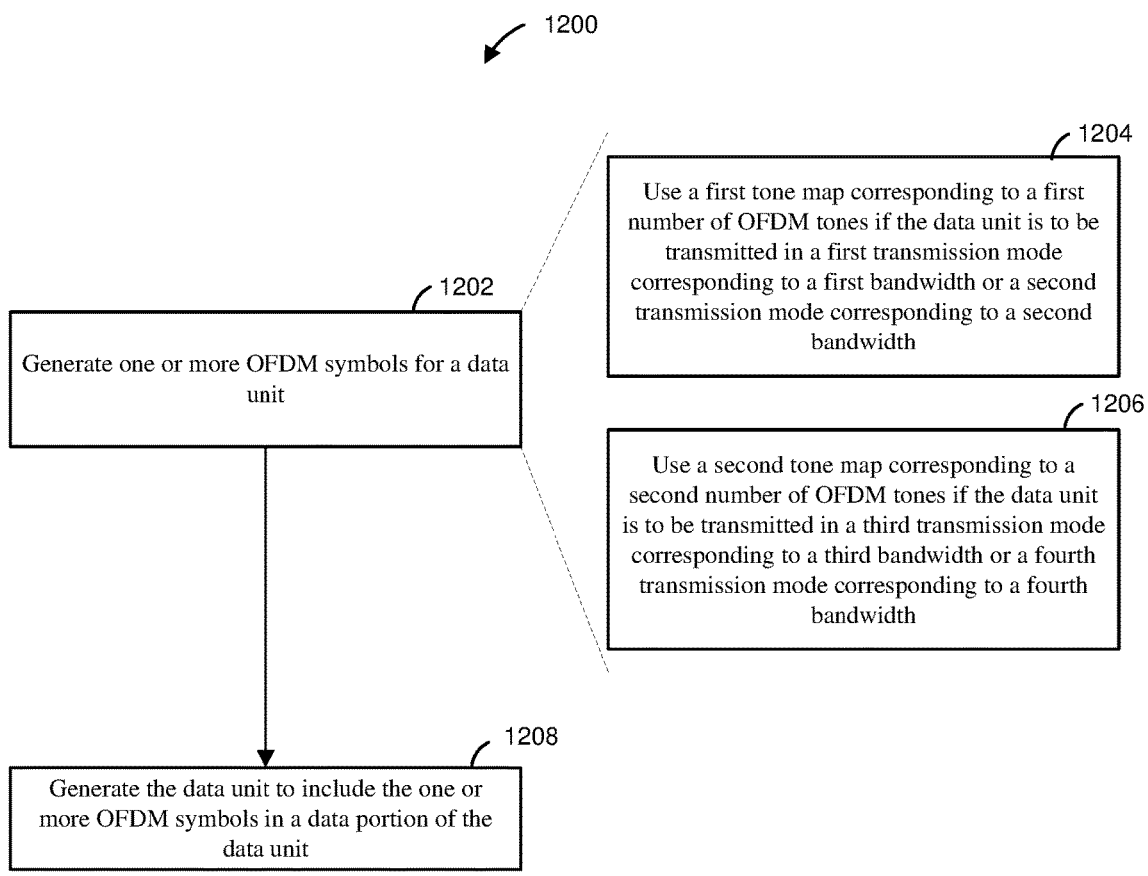
FIG. 12 is a flow diagram of a method for generating a data unit, according to another embodiment.

FIG. 12 is a flow diagram of an example method 1200 for generating a data unit, according to an embodiment. With reference to FIG. 1, the method 1200 is implemented by the network interface device 16, in an embodiment. For example, in one such embodiment, the PHY processing unit 20 is configured to implement the method 1200. According to another embodiment, the MAC processing 18 is also configured to implement at least a part of the method 1200. With continued reference to FIG. 1, in yet another embodiment, the method 1200 is implemented by the network interface device 27 (e.g., the PHY processing unit 29 and/or the MAC processing unit 28). In other embodiments, the method 1200 is implemented by other suitable network interface devices.

At block 1202, one or more OFDM symbols for a data unit are generated. Block 1202 includes blocks 1204 and 1206. At block 1204, if the data unit is to be transmitted in a first transmission mode corresponding to a first bandwidth or in a second transmission mode corresponding to a second bandwidth, the one or more OFDM symbols are generated based on a first tone map corresponding to a first number of OFDM tones. In an embodiment, the second bandwidth is twice of the first bandwidth. For example, in an embodiment, the first bandwidth is 20 MHz and the second bandwidth is 40 MHz. In other embodiments, the first bandwidth is a suitable bandwidth different from 20 MHz and/or the second bandwidth is a suitable bandwidth different from 40 MHz. In an embodiment, the first tone map corresponds to 256 OFDM tones (e.g., the tone map 700 of FIG. 7 or another suitable tone map having 256 OFDM tones). In this embodiment, if the data unit is to be transmitted in the first transmission mode corresponding to the first bandwidth, each OFDM symbol generated at block 1204 includes 256 OFDM tones generated based on the first tone map. Continuing with the same embodiment, if the data unit is to be transmitted in the second transmission mode corresponding to the second bandwidth, each OFDM symbol generated at block 1204 includes 512 OFDM tones. In particular, if the data unit is to be transmitted in the second transmission mode, each OFDM symbol generated at block 1204 includes two blocks of 256 OFDM tones, wherein each block corresponds to a sub-band of the second bandwidths and is generated based on the first tone map shifted or mirrored to the corresponding sub-band, in an embodiment. For example, a first block corresponds to the lower 20 MHz sub-band of the 40 MHz-wide channel and is generated based on the first tone map shifted or mirrored to the lower 20 MHz sub-band of the 40 MHz-wide channel, and a second block corresponds to the upper 20 MHz sub-band of the 40 MHz-wide channel and is generated based on the first tone map shifted or mirrored to the upper 20 MHz sub-band of the 40 MHz-wide channel, in an embodiment. In another embodiment, the first tone map includes a suitable number of OFDM tones different from 256 OFDM tones.

At block 1206, if the data unit is to be transmitted in a third transmission mode corresponding to a third bandwidth or in a fourth transmission mode corresponding to a fourth bandwidth, the one or more OFDM symbols are generated based on a second tone map corresponding to a second number of OFDM tones. In an embodiment, the third bandwidth is twice of the second bandwidth and the fourth bandwidth is twice of the third bandwidth. For example, continuing with the embodiment above, if at block 1204 the first bandwidth is 20 MHz and the second bandwidth is 40 MHz, then at block 1206 the third bandwidth is 80 MHz and the fourth bandwidth is 160 MHz, in an embodiment. In other embodiments, the third bandwidth is a suitable bandwidth different from 80 MHz and/or the fourth bandwidth is a suitable bandwidth different from 160 MHz. In an embodiment, the second tone map corresponds to 1024 OFDM tones. In this embodiment, if the data unit is to be transmitted in the third transmission mode corresponding to the third bandwidth, each OFDM symbol generated at block 1206 includes 1024 OFDM tones (e.g., the tone map 900 of FIG. 9 or another suitable tone map having 1024 OFDM tones). Continuing with the same embodiment, if the data unit is to be transmitted in the fourth transmission mode corresponding to the fourth bandwidth, each OFDM symbol generated at block 1206 includes 2048 OFDM tones. In particular, if the data unit is to be transmitted in the second transmission mode, each OFDM symbol generated at block 1206 includes two blocks of 1024 OFDM tones, wherein each block corresponds to a sub-band of the fourth bandwidths and is generated based on the second tone map shifted or mirrored to the corresponding sub-band of the fourth bandwidths, in an embodiment. For example, a first block corresponds to the lower 80 MHz sub-band of the 160 MHz-wide channel and is generated based on the first tone map shifted or mirrored to the lower 80 MHz sub-band of the 160 MHz-wide channel, and a second block corresponds to the upper 80 MHz sub-band of the 160 MHz-wide channel and is generated based on the first tone map shifted or mirrored to the upper 80 MHz sub-band of the 160 MHz-wide channel, in an embodiment. In another embodiment, the second tone map includes a suitable number of OFDM tones different from 1024 OFDM tones.

At block 1208, the data unit is generated. In an embodiment, one of the data unit 200 of FIG. 2A or the data unit 1000 of FIG. 10 is generated. In another embodiment, another suitable data unit is generated. The data unit is generated to include the one or more OFDM symbols generated at block 1202, in an embodiment. The data unit is generated to include the one or more OFDM symbols generated at block 1202 in a data portion of the data unit, in an embodiment.

Further aspects of the present invention relate to one or more of the following clauses.

In an embodiment, a method for generating a data unit for transmission via a communication channel, the data unit conforming to a first communication protocol, includes generating, at a communication device, one or more orthogonal frequency division multiplexing (OFDM) symbols, wherein each OFDM symbol of the one or more OFDM symbols (i) occupies a first bandwidth, (ii) is generated with a first tone spacing, and (iii) includes a set of pilot tones. The first tone spacing is a fraction 1/N of a second tone spacing, the second tone spacing defined for the first bandwidth by a second communication protocol, wherein N is a positive integer greater than one. The set of pilot tones includes a same number of pilot tones as defined for the first bandwidth by the second communication protocol. The method additionally includes generating, at the communication device, the data unit to include the one or more OFDM symbols in a data portion of the data unit.

In other embodiments, the method includes any suitable combination of one or more of the following features.

Generating the one or more OFDM symbols includes encoding information bits using one or more binary convolution code (BCC) encoders to generate coded bits, interleaving the coded bits using a first set of interleaving parameters, wherein interleaving parameters in the first set of interleaving parameters are scaled versions of corresponding interleaving parameters in a second set of interleaving parameters, the second set of interleaving parameters defined for the first bandwidth by the second communication protocol, mapping the interleaved coded bits onto a plurality of constellation points, and forming the one or more OFDM symbols based on the plurality of constellation points.

The first set of interleaving parameters includes $N_{col}$, $N_{row}$, and $N_{rot}$.

$N_{col}$ of the first set of interleaving parameters is $N_{col}$ of the second set of interleaving parameters multiplied by square root of N and adjusted based on a total number of data tones in each OFDM symbol.

$N_{row}$ of the first set of interleaving parameters is $N_{row}$ of the second set of interleaving parameters multiplied by square root of N.

$N_{rot}$ of the first set of interleaving parameters is $N_{rot}$ of the second set of interleaving parameters multiplied by N.

Generating the one or more OFDM symbols includes encoding information bits using one or more low density parity check (LDPC) encoders to generate coded bits, mapping blocks of coded bits onto constellation points; and mapping consecutively generated constellation points onto non-consecutive tones using a tone mapping distance $D_1$, wherein the tone mapping distance $D_1$ is a scaled version of corresponding tone mapping distance $D_2$ defined for the first bandwidth by the second communication protocol, wherein $D_1 = N \ast D_2$.

Each OFDM symbol of the one or more OFDM symbols further includes a first set of guard tones, and wherein the first set of guard tones includes a greater number of guard tones than a number of guard tones in a second set of guard tones, the second set of guard tones defined for the first bandwidth by the second communication protocol.

The first bandwidth is 80 MHz, and wherein each OFDM symbol of the one or more OFDM symbols includes 1024 tones.

The integer N is equal to four.

Generating the data unit further comprises generating the data unit to further include an extension signal field that follows the one or more OFDM symbols, wherein the extension signal field is generated using the second tone spacing defined for the first bandwidth by the second communication protocol.

In another embodiment, an apparatus comprises a network interface device having one or more integrated circuits configured to generate one or more orthogonal frequency division multiplexing (OFDM) symbols for a data unit that conforms to a first communication protocol, wherein each OFDM symbol of the one or more OFDM symbols (i) occupies a first bandwidth, (ii) are generated with a first tone spacing, and (iii) includes a set of pilot tones. The first tone spacing is a fraction 1/N of a second tone spacing, the second tone spacing defined for the first bandwidth by a second communication protocol, wherein N is a positive integer greater than one. The set of pilot tones includes a same number of pilot tones as defined for the first bandwidth by the second communication protocol. The one or more integrated circuits are further configured to generate the data unit to include the one or more OFDM symbols in a data portion of the data unit.

In other embodiments, the apparatus includes any suitable combination of one or more of the following features.

The one or more integrated circuits are further configured to encode information bits using one or more binary convolution code (BCC) encoders to generate coded bits to be included in the data unit.

The one or more integrated circuits are further configured to interleave the coded bits coded bits, including interleaving the coded bits using a first set of interleaving parameters, wherein interleaving parameters in the first set of interleaving parameters are scaled versions of corresponding interleaving parameters in a second set of interleaving parameters, the second set of interleaving parameters defined for the first bandwidth by the second communication protocol.

The one or more integrated circuits are further configured to map the interleaved coded bits onto a plurality of constellation points, and form the one or more OFDM symbols based on the plurality of constellation points.

The first set of interleaving parameters includes $N_{col}$, $N_{row}$, and $N_{rot}$.

$N_{col}$ of the first set of interleaving parameters is $N_{col}$ of the second set of interleaving parameters multiplied by square root of N and adjusted based on a total number of data tones in each OFDM symbol.

$N_{row}$ of the first set of interleaving parameters is $N_{row}$ of the second set of interleaving parameters multiplied by square root of N.

$N_{rot}$ of the first set of interleaving parameters is $N_{rot}$ of the second set of interleaving parameters multiplied by N.

The one or more integrated circuits are configured to encode information bits using one or more low density parity check (LDPC) encoders to generate coded bits.

The one or more integrated circuits are further configured to map blocks of coded bits onto constellation points.

The one or more integrated circuits are further configured to map consecutively generated constellation points onto non-consecutive tones such using a tone mapping distance $D_1$, wherein the tone mapping distance $D_1$ is a scaled version of corresponding tone mapping distance $D_2$ defined for the first bandwidth by the second communication protocol, wherein $D_1 = N*D_2$.

The one or more integrated circuits are configured to generate each OFDM symbol of the one or more OFDM symbols to further include a first set of guard tones, and wherein the first set of guard tones includes a greater number of guard tones than a number of guard tones in a second set of guard tones, the second set of guard tones defined for the first bandwidth by the second communication protocol.

The first bandwidth is 80 MHz, and wherein each OFDM symbol of the one or more OFDM tones includes 1024 tones.

The integer N is equal to four.

The one or more integrated circuits are further configured to generate the data unit to include (i) the one or more OFDM symbols and (ii) an extension signal field that follows the one or more OFDM symbols, wherein the extension signal field is generated using the second tone spacing defined for the first bandwidth by the second communication protocol.

In yet another embodiment, a method for generating a data unit for transmission via a communication channel includes generating, at a communication device, one or more orthogonal frequency division multiplexing (OFDM) symbols, including generating the one or more OFDM symbols based on a first tone map corresponding to a first number of OFDM tones or based on a second tone map corresponding to a second number of OFDM tones. The first tone map is used if the data unit is to be transmitted in a first transmission mode corresponding to a first bandwidth or a second transmission mode corresponding to a second bandwidth, wherein the second bandwidth is twice of the first bandwidth. The second tone map used if the data unit is to be transmitted in a third transmission mode corresponding to a third bandwidth or a fourth transmission mode corresponding to a fourth bandwidth, wherein the third bandwidth is twice of the second bandwidth and the fourth bandwidth is twice of the third bandwidth. The method additionally includes generating the data unit to include the one or more OFDM symbols in a data portion of the data unit.

In other embodiments, the method includes any suitable combination of one or more of the following features.

The first bandwidth is 20 MHz, the second bandwidth is 40 MHz, the third bandwidth is 80 MHz, and the fourth bandwidth is 160 MHz.

The first number of OFDM tones is 256 tones, the second number of OFDM tones is 512 tones, the third number of OFDM tones is 1024 tones, and the fourth number of OFDM tones is 2048 tones.

In still another embodiment, an apparatus comprises a network interface device having one or more integrated circuits configured to generate one or more orthogonal frequency division multiplexing (OFDM) symbols, including generating the one or more OFDM symbols based on a first tone map corresponding to a first number of OFDM tones or based on a second tone map corresponding to a second number of OFDM tones. The first tone map is used if the data unit is to be transmitted in a first transmission mode corresponding to a first bandwidth or a second transmission mode corresponding to a second bandwidth, wherein the second bandwidth is twice of the first bandwidth. The second tone map used if the data unit is to be transmitted in a third transmission mode corresponding to a third bandwidth or a fourth transmission mode corresponding to a fourth bandwidth, wherein the third bandwidth is twice of the second bandwidth and the fourth bandwidth is twice of the third bandwidth. The one or more integrated circuits are further configured to generate the data unit to include the one or more OFDM symbols in a data portion of the data unit.

In other embodiments, the apparatus includes any suitable combination of one or more of the following features.

The first bandwidth is 20 MHz, the second bandwidth is 40 MHz, the third bandwidth is 80 MHz, and the fourth bandwidth is 160 MHz.

The first number of OFDM tones is 256 tones, the second number of OFDM tones is 512 tones, the third number of OFDM tones is 1024 tones, and the fourth number of OFDM tones is 2048 tones. At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a physical layer (PHY) data unit for transmission via a communication channel, method comprising:

generating, at a communication device, a first portion of a PHY preamble of the PHY data unit to include a first plurality of orthogonal frequency division multiplexing (OFDM) symbols, wherein each OFDM symbol of the first plurality of OFDM symbols is generated with a first OFDM tone spacing;

generating, at the communication device, a second portion of the PHY preamble to include a second plurality of OFDM symbols, wherein each OFDM symbol of the second plurality of OFDM symbols is generated with a second OFDM tone spacing, wherein
the second OFDM tone spacing is a fraction 1/N of the first OFDM tone spacing, and
N is a positive integer greater than one;
generating, at the communication device, a PHY data portion of the PHY data unit to include one or more third OFDM symbols, wherein each third OFDM symbol is generated with the second OFDM tone spacing; and
transmit, by the communication device, the PHY data unit via the communication channel.

2. The method of claim 1, wherein:
generating the first portion of the PHY preamble of the PHY data unit includes generating OFDM symbols among the first plurality of OFDM symbols to have a first duration;
generating the second portion of the PHY preamble of the PHY data unit includes generating OFDM symbols among the second plurality of OFDM symbols to have a second duration that is at least double the first duration; and
generating the PHY data portion includes generating the third OFDM symbols to have a third duration that is at least double the first duration.

3. The method of claim 2, wherein:
the first portion of the PHY preamble includes a PHY signal field; and
the second portion of the PHY preamble includes one or more training fields.

4. The method of claim 1, wherein:
generating the first portion of the PHY preamble of the PHY data unit includes generating OFDM symbols among the first plurality of OFDM symbols to span 20 MHz and include at most 64 OFDM subcarriers;
generating the second portion of the PHY preamble of the PHY data unit includes generating OFDM symbols among the second plurality of OFDM symbols to span 20 MHz and include N*64 OFDM subcarriers; and
generating the PHY data portion includes generating the third OFDM symbols to span 20 MHz and include N*64 OFDM subcarriers.

5. The method of claim 1, wherein:
generating the first portion of the PHY preamble of the PHY data unit includes generating OFDM symbols among the first plurality of OFDM symbols to span 40 MHz and include at most 128 OFDM subcarriers;
generating the second portion of the PHY preamble of the PHY data unit includes generating OFDM symbols among the second plurality of OFDM symbols to span 40 MHz and include N*128 OFDM subcarriers; and
generating the PHY data portion includes generating the third OFDM symbols to span 40 MHz and include N*128 OFDM subcarriers.

6. The method of claim 1, wherein:
generating the first portion of the PHY preamble of the PHY data unit includes generating OFDM symbols among the first plurality of OFDM symbols to span 80 MHz and include at most 256 OFDM subcarriers;
generating the second portion of the PHY preamble of the PHY data unit includes generating OFDM symbols among the second plurality of OFDM symbols to span 80 MHz and include N*256 OFDM subcarriers; and
generating the PHY data portion includes generating the third OFDM symbols to span 80 MHz and include N*256 OFDM subcarriers.

7. The method of claim 1, wherein:
generating the first portion of the PHY preamble of the PHY data unit includes generating OFDM symbols among the first plurality of OFDM symbols to span 160 MHz cumulatively and include at most 512 OFDM subcarriers;
generating the second portion of the PHY preamble of the PHY data unit includes generating OFDM symbols among the second plurality of OFDM symbols to span 160 MHz cumulatively and include N*512 OFDM subcarriers; and
generating the PHY data portion includes generating the third OFDM symbols to span 160 MHz cumulatively and include N*512 OFDM subcarriers.

8. The method of claim 7, wherein:
generating the second portion of the PHY preamble of the PHY data unit includes:
i) generating a first 80 MHz segment using a first N*256-point inverse discrete Fourier transform (IDFT) calculator, and ii) generating a second 80 MHz segment using a second N*256-point IDFT calculator; and
generating the PHY data portion includes: i) generating a first 80 MHz segment using the first N*256-point IDFT calculator, and ii) generating a second 80 MHz segment using the second N*256-point IDFT calculator.

9. The method of claim 1, wherein N is four.

10. The method of claim 9, wherein:
the first OFDM tone spacing is 312.5 kHz; and
the second OFDM tone spacing is 78.125 kHz.

11. An apparatus, comprising:
a network interface device having one or more integrated circuits (ICs) configured to:
generate a first portion of a PHY preamble of a PHY data unit to include a first plurality of orthogonal frequency division multiplexing (OFDM) symbols, wherein each OFDM symbol of the first plurality of OFDM symbols is generated with a first OFDM tone spacing,
generate a second portion of the PHY preamble to include a second plurality of OFDM symbols, wherein each OFDM symbol of the second plurality of OFDM symbols is generated with a second OFDM tone spacing, wherein
the second OFDM tone spacing is a fraction 1/N of the first OFDM tone spacing, and
N is a positive integer greater than one; and
wherein the one or more ICs are further configured to:
generate a PHY data portion of the PHY data unit to include one or more third OFDM symbols, wherein each third OFDM symbol is generated with the second OFDM tone spacing, and
transmit the PHY data unit via a communication channel.

12. The apparatus of claim 11, wherein the one or more ICs are further configured to:
generate OFDM symbols among the first plurality of OFDM symbols to have a first duration;
generate OFDM symbols among the second plurality of OFDM symbols to have a second duration that is at least double the first duration; and
generate the third OFDM symbols to have a third duration that is at least double the first duration.

13. The apparatus of claim 12, wherein:
the first portion of the PHY preamble includes a PHY signal field; and
the second portion of the PHY preamble includes one or more training fields.

14. The apparatus of claim 11, wherein the one or more ICs are further configured to:
generate OFDM symbols among the first plurality of OFDM symbols to span 20 MHz and include at most 64 OFDM subcarriers;
generate OFDM symbols among the second plurality of OFDM symbols to span 20 MHz and include N*64 OFDM subcarriers; and
generate the third OFDM symbols to span 20 MHz and include N*64 OFDM subcarriers.

15. The apparatus of claim 11, wherein the one or more ICs are further configured to:
generate OFDM symbols among the first plurality of OFDM symbols to span 40 MHz and include at most 128 OFDM subcarriers;
generate OFDM symbols among the second plurality of OFDM symbols to span 40 MHz and include N*128 OFDM subcarriers; and
generate the third OFDM symbols to span 40 MHz and include N*128 OFDM subcarriers.

16. The apparatus of claim 11, wherein the one or more ICs are further configured to:
generate OFDM symbols among the first plurality of OFDM symbols to span 80 MHz and include at most 256 OFDM subcarriers;
generate OFDM symbols among the second plurality of OFDM symbols to span 80 MHz and include N*256 OFDM subcarriers; and
generate the third OFDM symbols to span 80 MHz and include N*256 OFDM subcarriers.

17. The apparatus of claim 11, wherein the one or more ICs are further configured to:
generate OFDM symbols among the first plurality of OFDM symbols to span 160 MHz cumulatively and include at most 512 OFDM subcarriers;
generate OFDM symbols among the second plurality of OFDM symbols to span 160 MHz cumulatively and include N*512 OFDM subcarriers; and
generate the third OFDM symbols to span 160 MHz cumulatively and include N*512 OFDM subcarriers.

18. The apparatus of claim 17, further comprising:
a first N*256-point inverse discrete Fourier transform (IDFT) calculator implemented on the one or more ICs; and
a second N*256-point IDFT calculator implemented on the one or more ICs;
wherein the one or more ICs are further configured to:
generate a first 80 MHz segment of the first portion of the PHY preamble using the first N*256-point IDFT calculator,
generate a second 80 MHz segment of the first portion of the PHY preamble using the second N*256-point IDFT calculator,
generate a first 80 MHz segment of the PHY data portion using the first N*256-point IDFT calculator, and
generate a second 80 MHz segment of the PHY data portion using the second N*256-point IDFT calculator.

19. The apparatus of claim 11, wherein N is four.

20. The apparatus of claim 19, wherein:
the first OFDM tone spacing is 312.5 kHz; and
the second OFDM tone spacing is 78.125 kHz.

21. The apparatus of claim 11, further comprising:
a medium access control (MAC) processing unit implemented on the one or more integrated circuits; and
a physical layer (PHY) processing unit coupled to the MAC processing unit, the PHY processing unit implemented on the one or more integrated circuits;
wherein the PHY processing unit is configured to
generate the first portion of the PHY preamble to include the first plurality of OFDM symbols,
generate the second portion of the PHY preamble to include the second plurality of OFDM symbols, and
generate the PHY data portion of the PHY data unit to include the one or more third OFDM symbols.

* * * * *